(12) United States Patent
Mason et al.

(10) Patent No.: US 12,288,274 B2
(45) Date of Patent: Apr. 29, 2025

(54) ENVIRONMENTAL IMAGING AND GRAPHICAL MAPPING SYSTEMS AND METHODS FOR TRACKING CLEANING ACTIVITY IN A PHYSICAL ENVIRONMENT

(71) Applicant: The Procter & Gamble Company, Cincinnati, OH (US)

(72) Inventors: Kristyna Brittanny Theresa Mason, West Chester, OH (US); Nicole Ashley Rizzo, Cincinnati, OH (US); Scott Kendyl Stanley, Mason, OH (US); William Henry Truran, Franklin, NJ (US)

(73) Assignee: The Procter & Gamble Company, Cincinnati, OH (US)

( * ) Notice: Subject to any disclaimer, the term of this patent is extended or adjusted under 35 U.S.C. 154(b) by 190 days.

(21) Appl. No.: 18/097,546

(22) Filed: Jan. 17, 2023

(65) Prior Publication Data
US 2023/0237712 A1 Jul. 27, 2023

Related U.S. Application Data

(60) Provisional application No. 63/302,674, filed on Jan. 25, 2022.

(51) Int. Cl.
*G06T 11/00* (2006.01)
*G06T 7/20* (2017.01)
*G06T 7/70* (2017.01)

(52) U.S. Cl.
CPC .............. *G06T 11/00* (2013.01); *G06T 7/20* (2013.01); *G06T 7/70* (2017.01); *G06T 2200/24* (2013.01)

(58) Field of Classification Search
CPC ... G06T 7/20; G06T 7/70; G06T 11/00; G06T 2200/24; G06T 19/006; G06T 2207/10016;
(Continued)

(56) References Cited

U.S. PATENT DOCUMENTS 10,624,516 B2   4/2020   Cudzilo
10,949,668 B2 *  3/2021   Ha .................... G06V 20/20
(Continued)

FOREIGN PATENT DOCUMENTS

JP    2019082807 A    5/2019
KR    20190059390 A   5/2019
(Continued)

OTHER PUBLICATIONS

PCT Search Report and Written Opinion for PCT/US2023/060715 dated Mar. 20, 2023, 19 pages.

*Primary Examiner* — Xilin Guo
(74) *Attorney, Agent, or Firm* — Kathleen Y. Carter

(57) ABSTRACT

Environmental imaging and graphical mapping systems and methods are disclosed herein for tracking cleaning activity in a physical environment is disclosed. A sensor captures environmental image(s) depicting at least a portion of a target area in the physical environment. A graphical mapping of the target area is generated. The graphical mapping region(s) define the target area. A position value is detected that corresponds to a physical position of a cleaning implement within the target area. The graphical mapping is updated to indicate that a region has a clean status. A graphical user interface (GUI) displays a graphical mapping of the target area that visually indicates that the region has the clean status.

22 Claims, 6 Drawing Sheets

(58) Field of Classification Search
CPC .......... G06T 7/73; G06T 7/246; G06V 20/52; G06V 20/20; G06V 20/58
See application file for complete search history.

(56) References Cited

U.S. PATENT DOCUMENTS

| | | | |
|---|---|---|---|
| 2018/0035606 A1 | 2/2018 | Burdoucci | |
| 2018/0055312 A1 | 3/2018 | Jung | |
| 2018/0061137 A1* | 3/2018 | Jung | A47L 9/009 |
| 2018/0074508 A1* | 3/2018 | Kleiner | G05D 1/2246 |
| 2018/0303306 A1 | 10/2018 | Johnson | |
| 2019/0117812 A1* | 4/2019 | Olsen | A61L 2/26 |
| 2020/0004237 A1 | 1/2020 | Kim et al. | |
| 2020/0246690 A1 | 8/2020 | Weitzman | |
| 2021/0400142 A1* | 12/2021 | Jorasch | H04L 65/1069 |

FOREIGN PATENT DOCUMENTS

| | | |
|---|---|---|
| KR | 102089063 B1 | 4/2020 |
| WO | 2020055125 A1 | 3/2020 |

* cited by examiner

ENVIRONMENTAL IMAGING AND GRAPHICAL MAPPING SYSTEMS AND METHODS FOR TRACKING CLEANING ACTIVITY IN A PHYSICAL ENVIRONMENT

FIELD OF THE INVENTION

The present disclosure generally relates to environmental imaging and graphical mapping systems and methods, and more particularly to, environmental imaging and graphical mapping systems and methods for tracking cleaning activity in a physical environment.

BACKGROUND OF THE INVENTION

Existing cleaning devices lack the ability to provide interactive experiences so as to provide incentive or motivation to finalize a cleaning task. In addition, previous electronic approaches to monitor cleaning activities in a physical space and to deliver information on progress and automate chore lists fail to incentivize other members of a staff or a household to participate in a way that can be tracked or monitored effectively.

While existing technology focuses on the technical problem of determining where an area has been cleaned, it does not solve the issue defining an area to be tracked or cleaned in the first instance. This can create an issue because cleaning areas can differ drastically by having different shapes, sizes, and dimensions which prohibits effective tracking, cleaning, and monitoring of cleaning within an environment.

For the foregoing reasons, there is a need for environmental imaging and graphical mapping systems and methods for tracking cleaning activity in a physical environment, as further described herein.

SUMMARY OF THE INVENTION

Generally, as described herein, environmental imaging and graphical mapping systems and methods are described for tracking cleaning activity in a physical environment. Such environmental imaging and graphical mapping systems and methods provide digital imaging based solutions for overcoming problems that arise from analyzing or dimensioning physical target areas or environments and then tracking motion through that environment for various purposes, including, for example cleaning the target area or environment.

A physical environment or target area may be analyzed with a sensor to generate data (e.g., such as LiDAR data) to automatically map the environment or target area to generate a graphical mapping. That is, in various aspects, an entire target area or physical environment may be mapped to provide a digital blueprint and related graphical view depicting progress or a final result of a task. The graphical mapping may be updated (e.g., in real-time) to provide tracking and monitoring regarding cleaning progress.

In addition, the target area or environment may be altered or transformed, by use of augmented reality (AR) and/or virtual reality (VR), in order to incentivize the activity or otherwise provide tracking or monitoring of the activity. In some aspects, by incorporating rewards, in the form of, for example, virtual coins or tokens to be collected, gamification of a particular area or environment may be implemented to incentivize users to perform a cleaning task designated within the target area or physical environment.

In one example, a first user (e.g., a primary user) may delegate a task to a second user (e.g., a secondary user that will perform the task). In the example, the first user may scan with a sensor (e.g., such as a LiDAR sensor or RGB camera) a target area and assign a cleaning task (e.g., cleaning or sweeping a floor) to the second user. The sensor may be a sensor of a computing device, such as a mobile phone implementing an environmental imaging application (app). The app may generate a digital representation (e.g., a graphical mapping) of the target area. The user may then select a desired cleaning region of the target area.

In some aspects, the user may also instruct the environmental imaging app to distribute a virtual incentive within the environment (e.g., as shown via AR or VR). An amount of the virtual incentive may also be selected for distribution. The virtual incentive may be received by the second user when the second user completes the task.

In further aspects, the first user may specify a cleaning implement (e.g., a cleaning device) to be used for the task. In such aspects, the environmental imaging app may be configured to identify or track positions or position values of the cleaning implement, or portions thereof, as the cleaning implement moves through the target area. For example, in some aspects, a computing device having a GUI (e.g., a GUI rendered via a standard display screen or via AR or VR screen or glasses) may be adapted to monitor or track the cleaning implement as it moves through the target area. In some aspects, the computing device (e.g., a mobile device or phone) may be attached to or coupled to the cleaning implement so as to maintain or image the cleaning implement and its movement through the target area.

As the cleaning implement moves through the target area, environmental imaging application (app) may generate a real time digital representation of the progress of the task completed. For example, a tracking trail may be updated in real time or near real time to show movement or progress. The tracking is based on the sensor (e.g., a sensor of the computing device) capturing additional information of the target area or physical environment in order to track motion in the environment.

In further aspects, the environmental imaging app may notify a user of a reward of a virtual inventive (e.g., collection of virtual or graphical coins) upon synchronization of the position of the virtual incentive as distributed in the target area.

More specifically, as described herein, an environmental imaging and graphical mapping method for tracking cleaning activity in a physical environment is disclosed. The environmental imaging and graphical mapping method may comprise obtaining one or more environmental images as captured by a sensor. Each of the one or more environmental images may depict at least a portion of a target area in the physical environment. The environmental imaging and graphical mapping method may further comprise generating, by one or more processors, a graphical mapping of the target area based on the one or more environmental images, the graphical mapping comprising one or more regions defining the target area. The environmental imaging and graphical mapping method may further comprise detecting, by the one or more processors, a position value corresponding to a physical position of a cleaning implement within the target area. The environmental imaging and graphical mapping method may further comprise updating, by the one or more processors, the graphical mapping to indicate that a region of the one or more regions has a clean status. The environmental imaging and graphical mapping method may further comprise displaying, on a graphical user interface (GUI), a graphical mapping of the target area. The graphical mapping is adapted to visually indicate that the region has the clean status.

In addition, as described herein, an environmental imaging and graphical mapping system is disclosed. The environmental imaging and graphical mapping system is configured to track cleaning activity in a physical environment. The environmental imaging and graphical mapping system may comprise a sensor configured to obtain environmental images. The environmental imaging and graphical mapping system may further comprise a cleaning implement. The environmental imaging and graphical mapping system may further comprise an environmental imaging application comprising computing instructions and configured for execution on one or more processors. The computing instructions when executed by the one or more processors, may cause the one or more processors to obtain one or more environmental images as captured by the sensor. Each of the one or more environmental images may depict at least a portion of a target area in the physical environment. The computing instructions when executed by the one or more processors, may further cause the one or more processors to generate a graphical mapping of the target area based on the one or more environmental images. The graphical mapping may comprise one or more regions defining the target area. The computing instructions when executed by the one or more processors, may further cause the one or more processors to detect a position value corresponding to a physical position of the cleaning implement within the target area. The computing instructions when executed by the one or more processors, may further cause the one or more processors to update the graphical mapping to indicate that a region of the one or more regions has a clean status. The computing instructions when executed by the one or more processors, may further cause the one or more processors to display, on a graphical user interface (GUI), a graphical mapping of the target area. The graphical mapping may visually indicating that the region has the clean status.

Further, as described herein, a tangible, non-transitory computer-readable medium storing instructions for tracking cleaning activity in a physical environment is disclosed. The instructions, when executed by one or more processors of a computing device cause the one or more processors of the computing device to obtain one or more environmental images as captured by a sensor. Each of the one or more environmental images may depict at least a portion of a target area in the physical environment. The instructions, when executed by one or more processors of a computing device may further cause the one or more processors of the computing device to generate a graphical mapping of the target area based on the one or more environmental images, the graphical mapping comprising one or more regions defining the target area. The instructions, when executed by one or more processors of a computing device may further cause the one or more processors of the computing device to detect a position value corresponding to a physical position of a cleaning implement within the target area. The instructions, when executed by one or more processors of a computing device may further cause the one or more processors of the computing device to update, by the one or more processors, the graphical mapping to indicate that a region of the one or more regions has a clean status. The instructions, when executed by one or more processors of a computing device may further cause the one or more processors of the computing device to display, on a graphical user interface (GUI), a graphical mapping of the target area. The graphical mapping may visually indicate that the region has the clean status.

The present disclosure relates to improvements to other technologies or technical fields at least because the present disclosure describes or introduces improvements to computing devices in the environmental imaging and graphical mapping field, whereby the environmental imaging and graphical mapping systems and methods execute on computing devices and improves the field of sensor based imaging and modeling, with analysis of 2D and/or 3D data in order to map or dimension an environment or target area that itself may then be digitally tracked and monitored via a generated graphical mapping. The graphical mapping may be incorporated in augmented reality (AR) and virtual reality (VR) applications. Such systems and methods are configured to operate using a reduced processing and/or memory by sampling a physical room and reduce the information in the room into a reduced data set, which may be based on polygons or cubes (e.g., a data mesh), and thus can operate on limited compute and memory devices, including mobile devices. Such reduction frees up the computational resources of an underlying computing system, thereby making it more efficient.

In addition, the present disclosure includes specific features other than what is well-understood, routine, conventional activity in the field, and that add unconventional steps that confine the claim to a particular useful application, e.g., environmental imaging and graphical mapping systems and methods for tracking cleaning activity in a physical environment.

Advantages will become more apparent to those of ordinary skill in the art from the following description of the preferred aspects which have been shown and described by way of illustration. As will be realized, the present aspects may be capable of other and different aspects, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts a particular aspect of the disclosed system and methods, and that each of the Figures is intended to accord with a possible aspect thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present aspects are not limited to the precise arrangements and instrumentalities shown, wherein.

The Figures depict preferred aspects for purposes of illustration only. Alternative aspects of the systems and methods illustrated herein may be employed without departing from the principles of the invention described herein.

DETAILED DESCRIPTION OF THE INVENTION

Figure 1:
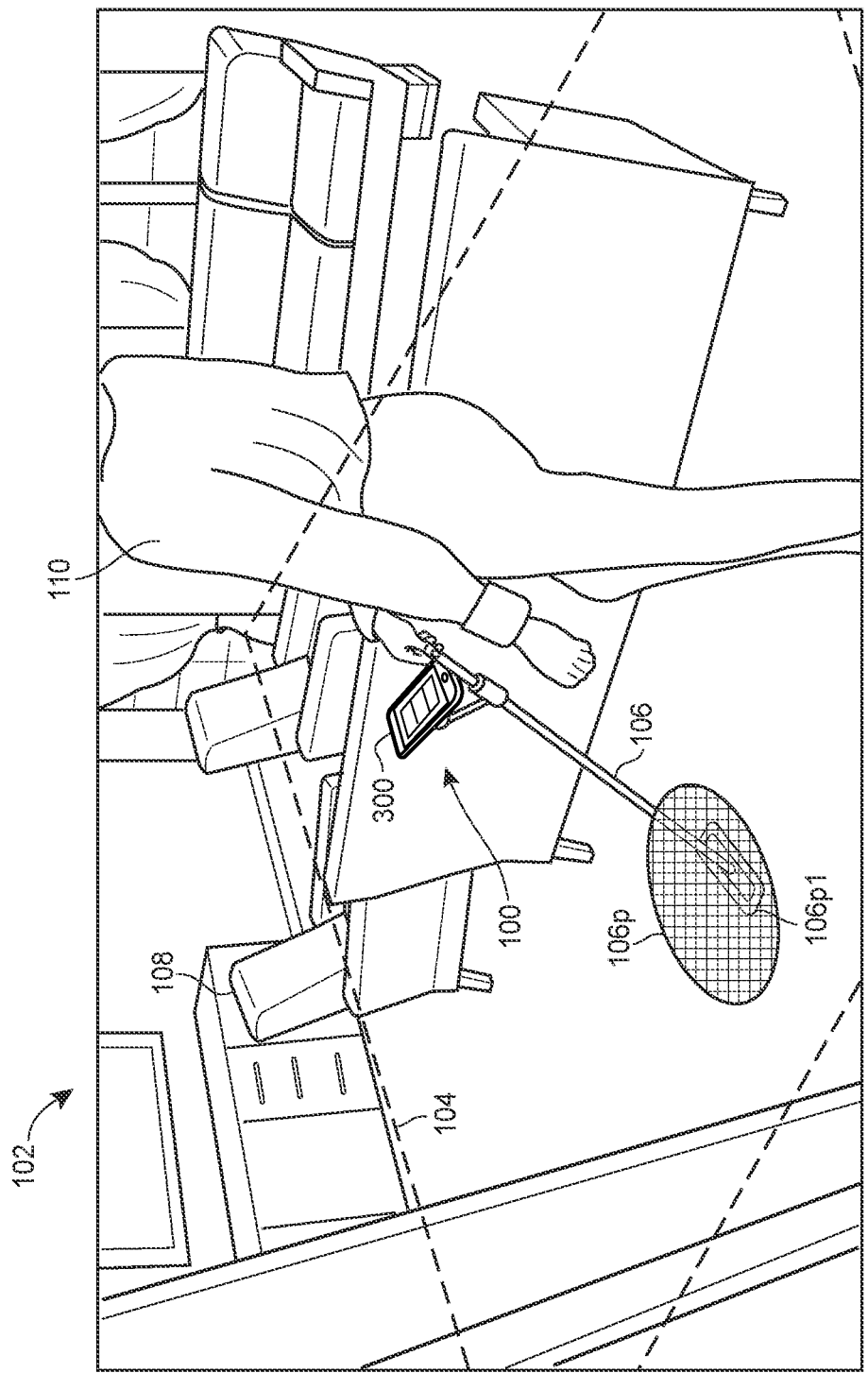
FIG. 1 illustrates an example environmental imaging and graphical mapping system configured to track cleaning activity in a physical environment, in accordance with various aspects disclosed herein.

FIG. 1 illustrates an example environmental imaging and graphical mapping system 100 configured to track cleaning activity in a physical environment 102, in accordance with various aspects disclosed herein. Environmental imaging and graphical mapping system 100 comprises a sensor configured to obtain environmental images.

With reference to FIG. 1, a sensor may comprise a camera on a computing device 300 (e.g., a mobile device, such as an APPLE IPHONE mobile device). However, a sensor may comprise various one or more types of sensors, including, by way of non-limiting example, an optical sensor, a sonar sensor, a camera, or other sensors as described herein. For example, optical sensors may comprise one-dimensional (single beam) or two-dimensional (2D) (sweeping) laser rangefinders. More generally, a sensor may comprise one or more of an optical sensor, an ultrasonic sensor, a radio-detection-and-ranging (RADAR) sensor, a light sensor (e.g., for capturing RGB images), a depth sensor, a laser sensor, a time of flight (ToF) sensor, and/or a light detection-and-ranging (LiDAR) sensor. The device containing the sensor may be coupled to an adjunct device to supply input for the mapping system. This adjunct device could be a drone, another mobile device, a home security or monitoring system, projection device, a smart TV or a robotic cleaning device. The adjunct device can then supply position data, cleaning history, display progress on adjunct GUI on other screens or project images onto the cleaning region to monitor progress, display game data and images and enhance game experience.

In some aspects a sensor may comprise multiple types of capture devices or sensors (e.g., a sensor group) which may include, by way of non-limiting example, a three-dimensional (3D) High Definition LiDAR sensor, a 3D Flash LiDAR sensor, and/or 2D and/or 3D sonar sensors and/or one or more 2D cameras that may comprise a sensor group. The sensor group may be used to capture environmental images for imaging or otherwise determine a physical environment (e.g., physical environment 102).

The environmental images, as captured by the sensor or sensor group, may comprise two-dimensional (2D) and/or three-dimensional (3D) images that illustrate, depict, or otherwise represent a physical representation of an area or otherwise space. As the term is used herein "environmental image" refers to 2D and/or 3D data, which may be, or which may comprise, pixel data, spatial data, point cloud data, and/or otherwise data that defines a 2D and/or 3D environment or environmental mapping, e.g., as captured by one or more respective 2D sensor(s) and/or 3D sensor(s). The data or information captured for a given environmental image may correspond to the type of sensor used. For example, a sensor and/or its respective environmental image or data may comprise a light-detection-and-ranging (LiDAR) sensor wherein at least one of the one or more environmental images comprises LiDAR data as captured by the LiDAR sensor. LiDAR may be used for determining ranges within an environment (e.g., physical environment 102) by targeting an object or space with a laser of a sensor (e.g., a LiDAR sensor) and measuring the time for the reflected light to return to the receiver of the sensor. In this way, by measuring a room, area, or otherwise physical environment, LiDAR can be used to make digital 3-D representations of such rooms, areas, or otherwise physical environments (e.g., target area 104 in the physical environment 102).

Additionally, or alternatively, a sensor and/or its respective environmental image or data may comprise a radio-detection-and-ranging (RADAR) sensor wherein at least one of the one or more environmental images comprises RADAR data as captured by the RADAR sensor.

RADAR may be used for determining ranges within an environment (e.g., physical environment 102) by targeting an object or space with sound waves of a sensor (e.g., RADAR sensor) and measuring the time for the reflected sound wave to return to the receiver of the sensor. In this way, by measuring a room, area, or otherwise physical environment, RADAR can be used to make digital 3-D representations of such rooms, areas, or otherwise physical environments (e.g., target area 104 in the physical environment 102).

Additionally, or alternatively, a sensor and/or its respective environmental image or data may comprise an ultrasonic sensor wherein the one or more environmental images are correlated with sound data of the target area in the physical environment.

More generally, LiDAR, RADAR, and/or ultrasonic sensor may operate in a similar, different, manner to capture 3D data, where such differences typically amount to the medium (e.g. light or sound waves used) to capture the 3D data.

Additionally, or alternatively, a sensor and/or its respective environmental image or data may comprise a camera sensor wherein at least one of the one or more environmental images comprises pixel-based data as captured by the camera sensor. Pixel based images may comprise 2D images, such as digital images. In various aspects, digital may comprise pixel data (e.g., LAB or RGB data as described below) comprising feature data and corresponding to one or more image features, within the respective image. The pixel data may be captured by a sensor of a computing device (e.g., computing device 300). Each pixel may be at a specific location within an image. In addition, each pixel may have a specific color (or lack thereof). Pixel color, may be determined by a color format and related channel data associated with a given pixel. For example, a popular color format is a 1976 CIELAB (also referenced herein as the "CIE L*-a*-b*" or simply "L*a*b*" or "LAB" color format) color format that is configured to mimic the human perception of color. Namely, the L*a*b* color format is designed such that the amount of numerical change in the three values representing the L*a*b* color format (e.g., L*, a*, and b*) corresponds roughly to the same amount of visually perceived change by a human. This color format is advantageous, for example, because the L*a*b* gamut (e.g., the complete subset of colors included as part of the color format) includes both the gamuts of Red (R), Green (G), and Blue (B) (collectively RGB) and Cyan (C), Magenta (M), Yellow (Y), and Black (K) (collectively CMYK) color formats.

In the L*a*b* color format, color is viewed as point in three dimensional space, as defined by the three-dimensional coordinate system (L*, a*, b*), where each of the L* data, the a* data, and the b* data may correspond to individual color channels, and may therefore be referenced as channel data. In this three-dimensional coordinate system, the L* axis describes the brightness (luminance) of the color with values from 0 (black) to 100 (white). The a* axis describes the green or red ratio of a color with positive a* values (+a*) indicating red hue and negative a* values (−a*) indicating green hue. The b* axis describes the blue or yellow ratio of a color with positive b* values (+b*) indicating yellow hue and negative b* values (−b*) indicating blue hue. Generally, the values corresponding to the a* and b* axes may be unbounded, such that the a* and b* axes may include any suitable numerical values to express the axis boundaries. However, the a* and b* axes may typically include lower and upper boundaries that range from approximately 150 to −150. Thus, in this manner, each pixel color value may be represented as a three-tuple of the L*, a*, and b* values to create a final color for a given pixel.

As another example, an additional or alternative color format includes the red-green-blue (RGB) format having red, green, and blue channels. That is, in the RGB format, data of a pixel is represented by three numerical RGB components (Red, Green, Blue), that may be referred to as a channel data, to manipulate the color of pixel's area within the image. In some implementations, the three RGB components may be represented as three 8-bit numbers for each pixel. Three 8-bit bytes (one byte for each of RGB) may be used to generate 24-bit color. Each 8-bit RGB component can have 256 possible values, ranging from 0 to 255 (i.e., in the base 2 binary system, an 8-bit byte can contain one of 256 numeric values ranging from 0 to 255). This channel data (R, G, and B) can be assigned a value from 0 to 255 that can be used to set the pixel's color. For example, three values like (250, 165, 0), meaning (Red=250, Green=165, Blue=0), can denote one Orange pixel. As a further example, (Red=255, Green=255, Blue=0) means Red and Green, each fully saturated (255 is as bright as 8 bits can be), with no Blue (zero), with the resulting color being Yellow. As a still further example, the color black has an RGB value of (Red=0, Green=0, Blue=0) and white has an RGB value of (Red=255, Green=255, Blue=255). Gray has the property of having equal or similar RGB values, for example, (Red=220, Green=220, Blue=220) is a light gray (near white), and (Red=40, Green=40, Blue=40) is a dark gray (near black).

In this way, the composite of three RGB values creates a final color for a given pixel. With a 24-bit RGB color image, using 3 bytes to define a color, there can be 256 shades of red, and 256 shades of green, and 256 shades of blue. This provides 256×256×256, i.e., 16.7 million possible combinations or colors for 24 bit RGB color images. As such, a pixel's RGB data value indicates a degree of color or light each of a Red, a Green, and a Blue pixel is comprised of. The three colors, and their intensity levels, are combined at that image pixel, i.e., at that pixel location on a display screen, to illuminate a display screen at that location with that color. In is to be understood, however, that other bit sizes, having fewer or more bits, e.g., 10-bits, may be used to result in fewer or more overall colors and ranges. Further, it is to be understood that the pixel data may contain additional or alternative color format and channel data. For example, the pixel data may include color data expressed in a hue saturation value (HSV) format or hue saturation lightness (HSL) format.

As a whole, the various pixels, positioned together in a grid pattern (e.g., comprising pixel data of position 106 where FIG. 1 represents a digital image of physical environment 102), form a digital image or portion thereof. A single digital image can comprise thousands or millions of pixels or channels. Images can be captured, generated, stored, and/or transmitted in a number of formats, such as JPEG, TIFF, PNG and GIF. These formats use pixels to store or represent the image.

With reference to FIG. 1, the area of position 106$p$ may comprise, for a digital image, a plurality of pixels. The pixel data, and features thereof, may define a position of the cleaning implement 106, including the position and/or pixel area of the head of the cleaning implement 106$p$1, within the target area 104. The head of the cleaning implement 106$p$1 is generally the portion of the cleaning implement that performs a cleaning activity or action, or that is otherwise associated with the activity of cleaning the target area. For example, pixels may define features determined from or otherwise based on one or more pixels in a digital image such as the head of the cleaning implement 106$p$1 that is currently cleaning the floor. For example, with respect to FIG. 1, pixels of the position 106$p$ may each comprise or be part of a pixel set or group of pixels depicting, or otherwise indicating, a head of the cleaning implement 106$p$1 respectively, where each pixel comprises a darker pixel color (e.g., pixels with relatively low L* values and/or pixels with lower RGB values) that are indicative of given feature(s) of the image. For example, groups of pixels can represent features of the image. That is, in a specific example, an edge of the head of the cleaning implement 106 be determined by an abrupt change in RGB values indicating that the neighboring pixels belong to two different surfaces. A collection of surface edges can be used to determine a head or cleaning implement outline, and the position of those edges relative to other parts of the cleaning implement can be used to determine which part of the cleaning implement (e.g., the head, which applies cleaning solution or formula to the floor) has been located.

Additionally, or alternatively, a known distance or positional offset may be predefined between a position of a sensor or sensor group and the head of a cleaning implement (e.g., head of the cleaning implement 106$p$1). For example, a clean status may further be determined by a sensor being positioned within the target area based on a known distance or positional offset between the sensor and at least a portion of the cleaning implement. By way of example, the known distance or positional offset may be used as a further data indicator to determine whether the cleaning implement, or head of the cleaning implement, is in a position to perform cleaning. In one non-limiting example, a known distance or positional offset may be predefined between a sensor or sensor group of a mobile device and a head of a cleaning implement having a cleaning pad designed to clean a floor surface. When the sensor or sensor group provides data indicating that its respective device (e.g., mobile device) is in a position where the cleaning pad is on the floor (based on the known distance or positional offset), then a data indicator or otherwise status value may be provided to indicate that cleaning is occurring (or has occurred) within the target area. In general, a pre-determined number of passes through a position may be defined as required for the area to be cleaned. The number of passes through the area can be established by a pre-set number, for example 1, 2 or 3 to the desired number of passes, or may be determined through an analysis of sequential images collected over the course of the cleaning session or the overall history of cleaning the selected region. In one embodiment the images can be used to train an artificial intelligence program to determine what is sufficient cleaning. The determination of the position of the cleaning implement relative to the image capturing device (mobile device) may be accomplished through various means. In one embodiment the cleaning implement may have an embedded, attached or printed optical readable code such as a barcode, QR code or similar. The code can be read by the sensor on the mobile device. The code can contain such information such as the standard distance between the cleaning implement and the mobile device, the type of cleaning implement (dry, wet or scrubbing), the number of disposable implements left in stock and the like. In another embodiment the cleaning implement can have attached an adjunct device such as a bluetooth enabled device that can relay position to the mobile device. A typical adjunct device from a third party is an AirTag, a tracking device developed by Apple Inc. Such devices need to be small and typical require voltages in the 2-6 V range, typically 3V.

Still further, additionally or alternatively, in some aspects, images captured at different times may further be used, alone or together, to indicate whether target area 104 (or a portion thereof) has been cleaned. In such aspects, at least two images may be compared where a first image may be a pre-cleaning image and a second image may be a post-cleaning image. The pre-cleaning image may comprise an image captured before the cleaning implement, or head of the cleaning implement 106p1, moved through a target area 104 (or portion thereof), as determined by one or more sensors. The post-cleaning image may comprise an image captured after or during the cleaning implement, or head of the cleaning implement 106p1, moves through a target area 104 (or portion thereof), as determined by one or more sensors. Pixel data of the pre-cleaning image and the post-cleaning image may then be compared to detect whether imaging artifacts (e.g., streaks, crumbs, dirt, or other differences as determined from the data, such as pixels value therein, respectively) have been removed, changed, or otherwise altered to indicate whether the target area 104 (or portion thereof) has been cleaned. A data indicator or otherwise status value may be provided to indicate that cleaning is occurring (or has occurred) within the target area. In this way, a clean status may further be determined by a first image and a second image as captured by the sensor, where the first image defines a pre-cleaning image and the second image comprises a post-cleaning image, and where imaging artifacts that differ in the second image compared to the first image indicate that cleaning has occurred or is occurring in the target area. In embodiments the images can be used to train AI to determine what is sufficient cleaning where sufficient cleaning can be determined by the level of user's assessment of the cleaned region.

In some aspects, the environmental images may comprise various data types and/or formats as captured by a sensor group made up of a plurality of sensors. For example, a sensor group may comprise various 2D and/or 3D imaging capture systems or cameras, including, by way of non-limiting example, LiDAR based digital images, time-of-flight (ToF) based digital images, other similar types of images as captured by 2D and/or 3D imaging capture systems, sensors, and/or cameras. For example, ToF based digital images, and/or related data, are determined from using a reference speed, e.g., the speed of light (or sound), to determine distance. ToF measures the time it takes for light (or sound) to leave a device (e.g., user computing device 300), bounce off an object, plane, and/or surface (e.g., an object in a room (e.g., physical environment 102)), and return to the device. Such time measurement can be used to determine the distance from the device to the object, plane, and/or surface. More generally, LiDAR is a specific implementation of ToF that uses light and the speed of light for distance determination and 3D image determination. Generally, LiDAR specific implementation uses pulsed lasers to build a point cloud, which may then be used to construct a 3D map or image, e.g., such as a graphical mapping as described herein. Compared to LiDAR, typical implementations of ToF image analysis involves a similar, but different, creation "depth maps" based on light detection, usually through a standard RGB camera.

With respect to the disclosure herein, LiDAR, ToF, and/or other 3D imaging techniques are compatible, and may each, together or alone, be used with, the disclosure and/or aspects herein, for example to generate a graphical mapping 310, generate a data mesh, or otherwise image or measure an area as described herein. In various aspects, such digital images may be saved or stored in formats, including, but not limited to, e.g., JPG, TIFF, GIF, BMP, PNG, and/or other files, data types, and/or formats for saving or storing such images.

In addition, environmental images (e.g., as used to generate a graphical mapping 310 or determine a data mesh) may comprise color and/or channel data, including by way of non-limiting example, red-green-blue (RGB) data, CIELAB (LAB) data, hue saturation value (HSV) data, and/or or other color formats and/channels as captured by 2D sensors, as described herein. Such digital images may be captured, stored, processed, analyzed, and/or otherwise manipulated and used as described herein, by environmental imaging and graphical mapping system 100.

With further reference to FIG. 1, environmental imaging and graphical mapping system 100 may further comprise a cleaning implement. For example, as shown in FIG. 1 the cleaning implement 106 is a floor cleaning implement, which is depicted as a SWIFFER floor cleaning implement or device as provided by the PROCTER & GAMBLE COMPANY. Cleaning implement 106 is depicted as moving within or through physical environment 102.

It is to be understood that other cleaning implements are also contemplated including, by way of non-limiting example, any one or more of a broom, a baby wipe or related device, a cleaning wipe or related device, a disposable cleaning wipe (including wet or dry cleaning wipes, and/or cleaning wipes comprising fibers, foams, or textiles) or related device, an air blaster, an air freshener sprayer, an air knife, a besom, a brush, a building maintenance unit, a carpet beater, a carpet sweeper, a dust collector, a dishwasher, a dry-ice blasting device, a feather duster, a floor scrubber, a floor-cloth, a hot water extraction device, an ice blaster device, a laundry ball, a lint remover, melamine foam or device, a microfiber cloth or related device, a mop, a steam mop, a mop bucket cart, a pipe cleaner, a pressure washing device, washing machine, a scrubber, a soap dispenser, a sponge or related device, a tooth brush, a tongue cleaner, a vacuum cleaner, a vapor steam cleaner, a wire brush, or the like. Additional cleaning implements are also contemplated herein, including by way of non-limiting example, lawn care cleaning implements such as a rake, leaf blower, lawn mower, fertilizer, pesticide or herbicide spreader (or sprayer for interior or exterior use) or the like. Interior sprayers, spreaders, or traps or patches for pesticides, insecticides or repellants are also contemplated as cleaning implements. Any one or more of these cleaning implements may be configured to incorporate the systems and methods here.

With further reference to FIG. 1, environmental imaging and graphical mapping system 100 may further comprise an environmental imaging application (app) comprising computing instructions. The imaging app may be stored on a tangible, non-transitory computer-readable medium, such as RAM or ROM memory of a computing device (e.g., computing device 300). The imaging app may comprise computing instructions for tracking cleaning activity in a physical environment. The computing instructions of the imaging app, when executed by one or more processors of the computing device, may cause the one or more processors of the computing device to implement or execute an algorithm or method, such as example environmental imaging and graphical mapping method 200 or other such algorithms as disclosed herein.

For example, in various aspects, herein, the execution of the computing instructions may cause the one or more processors, to obtain one or more environmental images as captured by the sensor. Each of the one or more environmental images may depict or define at least a portion of a target area 104 in the physical environment 102. The target area comprise an area within the environmental imaging and graphical mapping system 100 operates. In the example of FIG. 1, this includes the room or target area, as shown, to be cleaned or for cleaning by the cleaning implement 106. It is to be understood, however, that target areas for cleaning are contemplated herein, including, by way of non-liming example, floor cleaning (e.g., sweeping, vacuuming, mopping); tidying (e.g., pre-cleaning, sorting objects, removing garbage, etc.); washing clothes (e.g., sorting, stain identification, cycle selection); folding (e.g., clothes, making beds, etc.); dishes (e.g., hand washing, loading, and unloading dishwasher); surface cleaning (e.g., cleaning countertops, dusting, etc.); and/or trash (e.g., throwing away used disposables, emptying). Other target areas, able to be imaged as described, are further contemplated herein.

The cleaning implement 106 has a position value that indicates or otherwise determines which area of the target area is being cleaned. In the example of FIG. 1, the position value 106*p* is the area of the floor currently being cleaned by the head of cleaning implement 106. Position value 106*p* may represent one or more points in one or more environmental images as captured by the sensor. For example, for a LiDAR based sensor, position value 106*p* comprises 3D position data within one or more environmental images, which in this case are 3D images, that represent, identify, or otherwise correspond to the area currently being cleaned the cleaning implement (e.g., the area currently being cleaned by the head of cleaning implement 106).

As a further example, for a camera or RGB based sensor, position value 106*p* comprises 2D position data within one or more environmental images, which in this case are 2D images, that represent, identify, or otherwise correspond to the area currently being cleaned by the cleaning implement (e.g., the area currently being cleaned by the head of cleaning implement 106). More generally, the position value 106*p* may correspond to specific data types or formats based on the sensor or sensor types used in scanning the physical environment (e.g., physical environment 102) or target area (e.g., target area 104).

It is to be understood, however, that other position values for other cleaning implements are contemplated herein, including, by way of non-liming example, an area of a mop head, an area of a broom head, an area of a vacuum head, an area of a duster, an area of a sponge, an area of a paper towel, or the like.

The one or more processors may be processor(s) of a computing device (e.g., computing device 300) may comprise a user's (e.g., user 110)'s mobile phone. In such aspects, the cleaning implement may be configured to receive the mobile device as an attachment, for example, where the cleaning implement has a holder or attach point for accepting or holding the mobile device or computing device. As illustrated for FIG. 1, the mobile device is attached to a shaft of the cleaning implement. In such aspects, the mobile device can generate a position value, as further described herein, as the cleaning implement moves within the target area. A mobile device with an optical sensor positioned in this way is capable of simultaneously acquiring the image of the cleaning implement as well as the area to be cleaned while engaged in the cleaning process. By comparing successive images of the cleaning implement or the disposable part thereof (for example a Swiffer Pad), an assessment of the capacity of the cleaning implement (or pad) can be made. This assessment can be used to determine whether the pad is in contact with the floor, whether the particular pad is effective at cleaning the desired surface or whether the pad needs to be changed. This information can then be used to inform any user of cleaning efficacy, pad consumption or other aspects of pad condition. The assessment can be made in near real time from image analysis of any part of the exposed surface of the cleaning implement. In the case of pads, dirt can build up near the edges of the pad and be visible even while still engaged in cleaning. Alternatively, a cleaning device may be configured so that the mop head that is contact with the surface to be cleaned can be swiveled about so that the majority of the cleaning pad or implement is exposed to the optical sensor, and a full check of the pad capacity and suitability can be done via the collected image. The information can then be used to inform user of efficacy and remaining capacity.

Additionally, or alternatively, in some aspects the one or more processors may be one or more processors of a wearable device, which may include virtual reality (VR) and/or augmented reality (AR) goggles and/or glasses, such as the OCULUS RIFT device. Other such wearable devices may include a watch or smart watch (e.g., a FITBIT watch), etc. or the like. In such aspects, the wearable device may generate a position value of the cleaning implement as the cleaning implement moves within the target area. For example, the wearable device may generate the position value dynamically based on the position of the cleaning implement's head or other cleaning portion (e.g., a portion having cleaning solution) as detected with the target area. Additionally, or alternatively, the wearable device may generate a positon value dynamically based on a predefined position of the wearable device with respect to the cleaning implement's head or other cleaning implement portion (e.g., a portion having cleaning solution). The predefined position could be an approximate position, such as a distance, that the wearable device is expected to be with respect to the cleaning implement's head or other portion of the cleaning implement.

Additionally, or alternatively, the one or more processors may comprise processor(s) of a server, where one or environmental images are transmitted, across a computer network (such as the Internet) to the server for analysis, processing, or otherwise use as described herein. Such aspects are discussed further herein with respect to FIG. 6.

Figure 2:
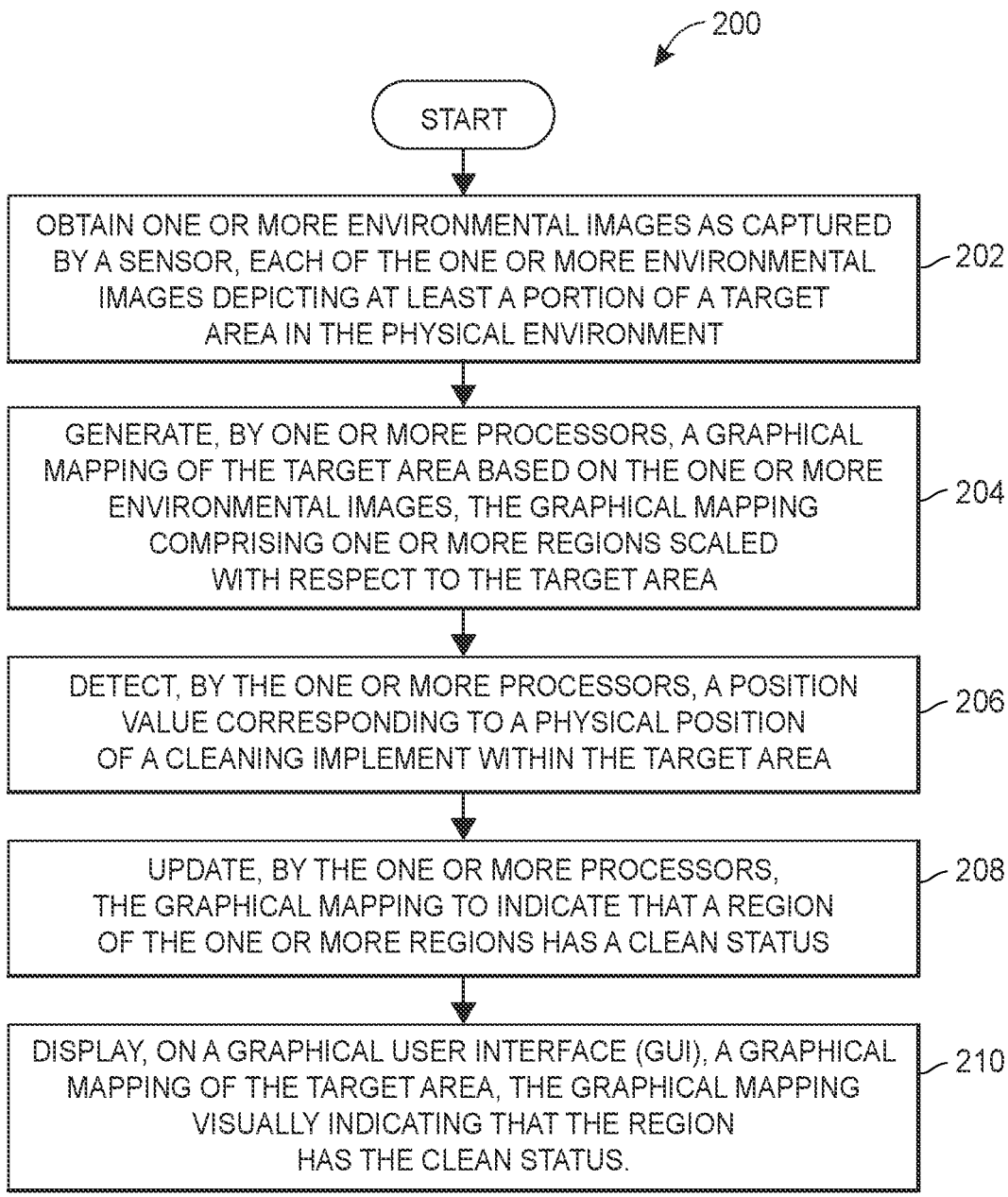
FIG. 2 illustrates an example environmental imaging and graphical mapping method for tracking cleaning activity in a physical environment, in accordance with various aspects disclosed herein.

FIG. 2 illustrates an example environmental imaging and graphical mapping method 200 for tracking cleaning activity in a physical environment, in accordance with various aspects disclosed herein. At block 202, environmental imaging and graphical mapping method 200 may comprise obtaining one or more environmental images as captured by a sensor. For example, a user (e.g., user 110) may scan a room to be cleaned with a device (e.g., computing device 300) that comprises one or more sensors. In some aspects, the one or more sensors may comprise a sensor group of one or more sensor types.

As described herein for FIG. 1, the environmental images may comprise data based on the type of sensor or sensors used. Such sensor data may comprise 2D and/or 3D data, which may be generated by LiDAR sensors, camera sensors, or other sensors as described herein. Each of the one or more environmental images may depict at least a portion of a target area (e.g., target area 104) in the physical environment (e.g., physical environment 102).

At block 204, environmental imaging and graphical mapping method 200 may further comprise generating a graphical mapping (e.g., graphical mapping 310 as described for FIG. 3) of the target area (e.g., target area 104) based on the one or more environmental images. In various aspects, the graphical mapping may comprise a digital mesh, graphic, or otherwise depiction or rendering of the cleaning area or room to be cleaned. For example, the graphical mapping may be a 2D or 3D digital mesh, graphic, or otherwise depiction or rendering. In addition, the graphical mapping may comprise one or more regions defining the target area. The one or more regions may comprise one or more areas within the digital mesh, graphic, or otherwise depiction or rendering. For example, for a digital mesh or polygonal mesh, the areas or regions may comprise one or more voxels of the polygonal mesh that define a particular area (or areas) of the target area. As a further example, additionally or alternatively, for a 2D graphical mapping, the areas or regions may comprise one or more pixels of a rasterized or vectored image that define a particular area (or areas) of the target area. An example graphical mapping is further illustrated by FIG. 3 herein. The target area may be defined by scaling the target area and/or reducing or scaling the target area into scaled pixels and/or voxels. Scaling of the target area and/or reduction of the target area into pixels and/or voxels allows for a reduction in the memory required for representing the target area graphically. This allows the underlying computing device (e.g. computing device 300) to operate more efficiently by requiring less memory and by operating on fewer graphical or digital objects which also reduces processing requirements of the processors of the computing device 300 and/or processors of servers 602 as described herein for FIG. 6. Additionally, or alternatively, horizontal elements (e.g., a planar surface) and vertical/nonplanar elements (e.g., furniture) in the physical environment may be differentiated within image or spatial data to define target area. Such horizontal elements and vertical/nonplanar elements may be contrasted or compared in order to define the target area. In one example, vertical elements (such as a chair, e.g., chair 108 of FIG. 1, or other vertical object within the target area) may be excluded or removed from a digital representation of the target area, e.g. such as the graphical mapping as described herein. In this way, a given target area may be defined without adding additional mapping elements to the graphical mapping, which provides an improvement in the reduction of memory needed to store the graphical mapping on a memory of an underlying computing device, and further provides an improvement because there are fewer mapping elements needed to be analyzed or reproduced (e.g., in a rendering of the target area) by a processor of the underlying computing device when assessing a clean status of the target area.

Additionally or alternatively, in some aspects, vertical plane elements (e.g., such as chair 108 of FIG. 1) may be ignored, filtered, or otherwise not captured during data capture and analysis. For example, in such aspects, images or related data as captured by a sensor may be used with motion data as determined from an accelerometer, gyro, or otherwise a motion sensor of a computing device (e.g., mobile device) to determine a precise location of the computing device and the computing device's orientation within a given target area (e.g., within 2D and/or 3D space). For example, the image data could be combined with the motion data to define, and track movement within, the target area. In such aspects, the vertical elements would not need to be understood from a z-axis (vertical perspective), but could rather be based on depth camera sensors combined with the motion sensor data. In such aspects, the horizontal plane, which is what would define the target area (or otherwise define a surface for cleaning within the target area), could be detected based on the data and given location as determined from the image sensor and motion sensor data.

In various aspects, the graphical mapping may be generated by an environmental imaging app (e.g., environmental imaging app 608 as described herein for FIG. 6) executing on one or more processors of a computing device (e.g., computing device 300). Additionally, or alternatively, the one or more processors may be generated by one or more servers, such as server(s) 602 as described for FIG. 6, where the graphical mapping may be generated remotely and transmitted, via computer network 620, for display on computing device 300.

At block 206, environmental imaging and graphical mapping method 200 may further comprise detecting, by the environmental imaging app executing on the one or more processors, a position value (e.g., position value 106p and/or head of the cleaning implement 106p1) corresponding to a physical position of a cleaning implement (e.g., cleaning implement 106) within the target area (e.g., target area 104). The physical position is typically an area in which the cleaning element or part is currently active in the target area 104. The cleaning element or part may be a SWIFFER device, a mop, or another cleaning portion of a cleaning implement that applies or implements a cleaning aspect, e.g., applying a cleaning solution to a floor, etc.

At block 208, environmental imaging and graphical mapping method may further comprise updating, by the environmental imaging app executing on the one or more processors, the graphical mapping (e.g., graphical mapping 310 of FIG. 3) to indicate that a region of the one or more regions has a clean status. The clean status may comprise a color, highlight, graphic, texture, or otherwise graphical element within the graphical mapping that indicates that a given region or otherwise area of the graphical mapping has been cleaned, or is currently being cleaned, by the cleaning implement. For example, in one aspect, a non-clean status may comprise a graphic depicting or showing a first color (e.g., white) or a graphical texture (e.g., grain or lumpy textured). When the cleaning implement moves through the target area 104, the graphical mapping may be updated with a second color (e.g., green or purples) or second graphical texture (e.g., sparkling or empty) to indicate that the area has been cleaned or otherwise that the area has the clean status. In addition, a graphic marker may be placed in areas that have been cleaned to further indicate a clean status. These graphical features may be rendered on a GUI (e.g., such as GUI 304 as describe herein). Additionally, or alternatively, other graphical features may be rendered or depicted on a GUI. Such graphic features (not shown) may include, by way of non-limiting example, a timer, a score, multiple player profiles, longitudinal tracking (data over many sessions), game characters, percentage of the area cleared, a graphical representation of the cleaning implement, cleaning implement status (e.g., how used or worn a head of the cleaning implement is expected to be), distance traveled, and/or the like, including any other data as describe herein. In addition, sound may also be played from the computing device, including, by way of non-limiting example, sound effects (e.g., when receiving a virtual incentive) and music as the user interacts with the system and cleans the target area with the cleaning implement.

In one specific aspect, the graphical mapping may comprise one or more regions (e.g., such as game regions for FIG. 5), where the target area 104 or otherwise physical environment 102 has been generated to appear or depict a video game or otherwise fictional environment. In such aspects, the target area 104 or otherwise physical environment 102 may have therein added objects, such as augmented reality (AR) objects, for example, digital coins. Of the added objects may be in specific game regions (which correspond to the one or more regions of the graphical mapping). When a user moves the cleaning implement through the target area 104 or otherwise physical environment 102, the game region (e.g., a game region having a virtual incentive such as a coin) will be updated to indicate that the coin has been acquired (where the coin is removed) to indicate the cleaning status of that region is clean. Additional examples of game regions are provided herein with respect to FIG. 5

Figure 3:
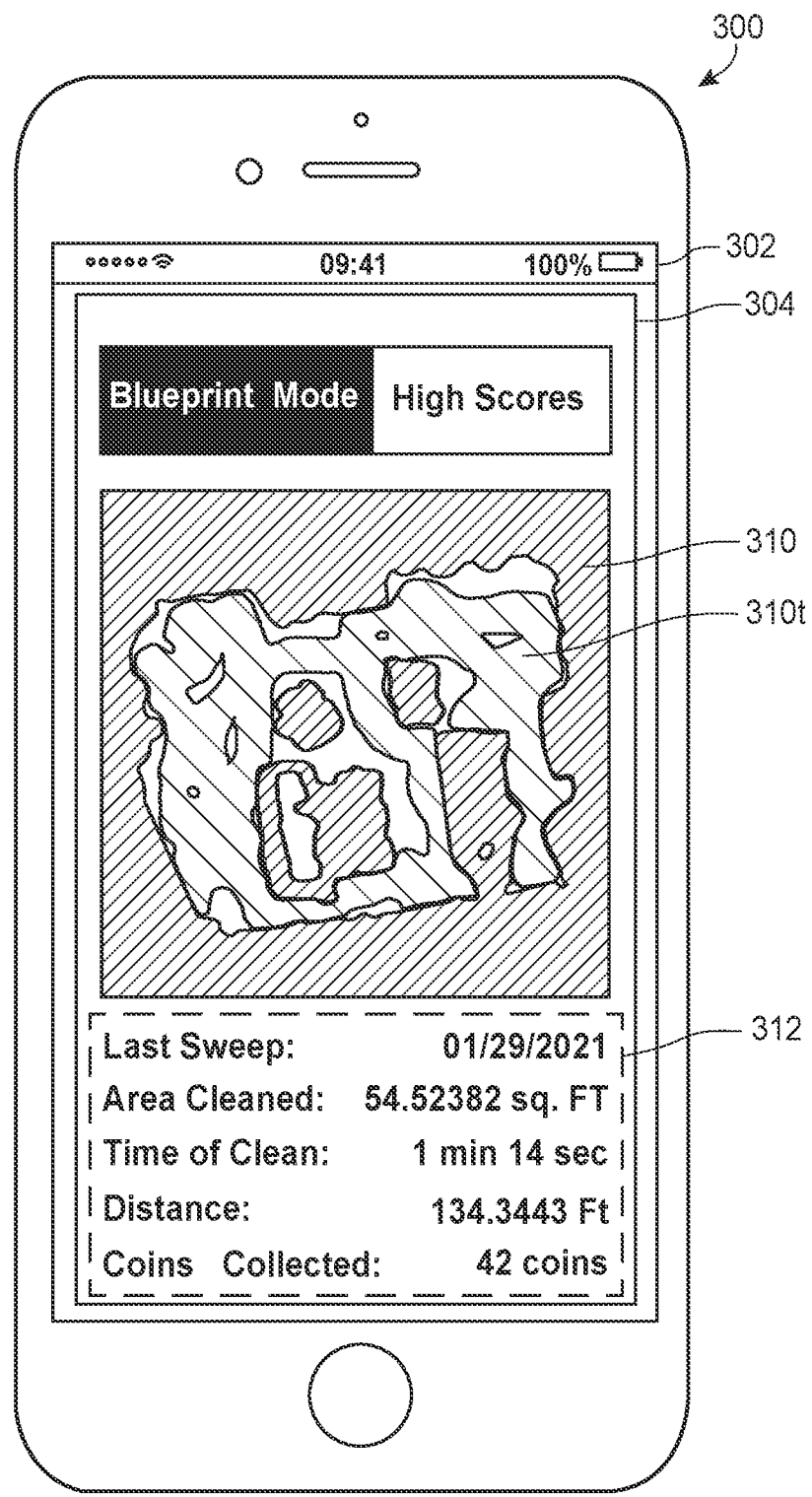
FIG. 3 illustrates an example graphic user interface (GUI) as rendered on a display screen of a user computing device and further illustrates a graphical mapping as displayed on the GUI, in accordance with various aspects disclosed herein.

With further reference to FIG. 3, at block 210, environmental imaging and graphical mapping method 200 may further comprise displaying, on a graphical user interface (GUI), a graphical mapping (e.g., graphical mapping 310) of the target area (e.g., target area 104). The graphical mapping is adapted to visually indicate that the region has the clean status. In various aspects, the GUI allows users to interact with electronic devices (e.g., computing device 300) through graphical icons and audio indicators (e.g., for example, the GUI may allow a user to selection buttons, options, or make choices as described herein). In some aspects, a GUI may include a virtual reality (VR) and/o augmented reality (AR) based GUI for viewing and/or manipulation of the graphical mapping via a VR and/or AR interface. Additional, or alternative, the GUI may be configured to display holographs for viewing and/or manipulation of the graphical mapping via a holographic interface.

FIG. 3 illustrates an example graphic user interface (GUI) as rendered on a display screen (e.g., display screen 302) of a user computing device (e.g., computing device 300) and further illustrates a graphical mapping 310 as displayed on the GUI, in accordance with various aspects disclosed herein. For example, as shown in the example of FIG. 3, GUI 304 may be implemented or rendered via an application (e.g., an app executing on computing device 300).

For example, as shown in the example of FIG. 3, GUI 304 may be implemented or rendered via a native app executing on user computing device 300. In the example of FIG. 3, user computing device 300 is a computer device as described herein, for example for FIGS. 1 and/or 6, e.g., where computing device 300 is illustrated as an APPLE IPHONE that implements the APPLE iOS operating system and that has display screen 302. User computing device 300 may execute one or more native applications (apps) on its operating system, including, for example, an app (e.g., environmental imaging app 608 of FIG. 6) or otherwise as described herein. Such native apps may be implemented or coded (e.g., as computing instructions) in a computing language (e.g., SWIFT) executable by the user computing device operating system (e.g., APPLE iOS) by the processor of user computing device 300. In various aspects, the imaging app (e.g., an environmental imaging app 608 or remote environmental imaging app 608r) executing on a mobile devices, such as user computing device 300, may be referred to as an application or app, designed to track cleaning activity in a physical environment. It is to be understood that environmental imaging app 608 refers to either the environmental imaging app 608 on computing device 300 and/or the environmental imaging app 608r on server(s) 602 as described for FIG. 6, because, in some aspects, the computing instructions for the environmental imaging app may be implemented where at least a portion of the environmental imaging app acts as client code on computing device 300 that communicates, via computer network 620, to a portion of the environmental imaging app as server code on server(s) 602. Such client-server code may be used to implement, for example, generation of the graphical mapping 310 where the environmental images are transmitted, via computer network 620, and where servers 602 generate the graphical mapping 310 and send it back to computing device 300.

Additionally, or alternatively, GUI 304 may be implemented or rendered via a web interface, such as via a web browser application, e.g., Safari and/or Google Chrome app(s), or other such web browser or the like.

Still further, additionally or alternatively, GUI 304 may be implemented or rendered via a VR or an AR interface. In such aspects, environmental imaging app 608 may be configured to render through a field of view or display screen of an augmented reality (AR) device (e.g., goggles or glasses of a an AR device), a virtual representation of graphical mapping or other aspects of a GUI herein. In some aspects, the display screen may be a display screen (e.g., display screen 302) of a computing device (e.g., computing device 300), that can render AR and/or VR images, such as an IPHONE or GOOGLE ANDROID device implementing and AR and/or VR application, such as the GOOGLE CARDBOARD app or the like. It is to be understood that AR images, and/or AR related data or information, may be rendered on a display screen (e.g., display screen 302) without any immersion (e.g., without VR immersion), where, in such aspects, the AR images, data, and/or information may be superimposed or overlaid on the display screen with one or more frame(s) as captured by a camera of the user computing device (e.g., of computing device 300). Additionally, or alternatively, AR imagery may be displayed on other screens and/or display devices (e.g., such as a television (TV) display, tablet display, VR/AR device display, and/or the like). In such aspects, the virtual representation of the graphical mapping, or aspects thereof such as a coin, gaming character or avatar, or other graphics may be superimposed on the graphical mapping. For example, the AR and/or VR image may include a graphical avatar and/or coins that are superimposed in the graphical mapping and may be interactive where a coin is shown as collected when the cleaning implement (or graphical avatar as shown in AR and/or VR) moves through the target area 104. Such aspect is further described herein for FIG. 5.

As shown for FIG. 3, graphical mapping 310 is rendered on or via GUI 304. In the example of FIG. 3, graphical mapping is shown as a 2D mapping on a mobile device. However, it is to be understood that a graphical mapping could also be a 3D mapping and could further be rendered via an AR and/or VR device as described herein.

With reference to FIG. 3, graphical mapping 310 depicts a 2D rendering of target area 104 and/or physical environment 102 as describe FIG. 1. For example, graphical mapping 310 depicts a top down view of target area 104 and/or physical environment 102 as describe FIG. 1. Further, in the example of FIG. 3, graphical mapping 310 depicts a trail 310t that that the cleaning implement has traversed, or is traversing, through with respect to the target area 104 and/or physical environment 102. The trail 310t is a graphical trail rendered in a different color, shade of color, contrast, graphic or image, and/or texture compared to the remainder of the target area 104 and/or physical environment 102, and that indicates the area or areas within the graphical mapping 310 that has a clean status, i.e., has been cleaned, or is in the process of being cleaned, by the cleaning implement 106. Trail 310t may be determined or rendered continuously or at discrete time periods, where GUI 304 may be updated when trail 310t is updated. Trail 310t may be constructed or generated by analyzing the position value 106p of the cleaning implement for one or more positions of the cleaning implement 106 within the target area 104 and/or physical environment 102. By determining the various position values (and times at which the positions values were captured), then the trail 310t may be drawn, rendered, superimposed, or otherwise displayed on graphical mapping 310 via GUI 304. Trail 310t may also be referred to as a "tracking trail" or "snail trail" showing either a cleaning implement movement or user movement in the target area and/or physical environment.

In various aspects, generation of the graphical mapping 310 may comprise determining the boundaries of a target area (e.g., target area 104) or otherwise cleaning area. This may further include determining one or more regions (e.g., creating game play areas or regions to be interacted with by the cleaning implement). In various aspects, generation of the graphical mapping 310 may be based on the data collected by sensor of computing device 300. For example, as described herein, LiDAR data may be used to generate graphical mapping 310. LiDAR data can be captured by computing device 300 via a sensor (e.g., such as on a mobile device). Additionally, or alternatively, the sensor may be separate from mobile device (e.g., captured by a separate device).

Generation of graphical mapping 310 with LiDAR may comprise creation of a horizontal mesh or otherwise data mesh as generated by or that is otherwise visible to an sensor or camera (e.g., such as an orthographic camera). One or more graphical or virtual pins may be placed at or near the edges of the data mesh. In this way, such pins identify, define, or otherwise record (in memory of computing device 300) the perimeter of a given target area (e.g., target area 104). The application (e.g., app 608), as executing on one or more processors (e.g., of computing device 300), is configured to determine a number of polygons inside of the environment (e.g., target area 104 and/or physical environment 102). The application (e.g., app 108) then counts or otherwise determines a number of pixels or graphic positions in each of these polygons. Based on the mesh, the app can then determine the furthest areas or pins within a bounded area (e.g., target area 104). This may be a region, area, or game play area e.g., as described herein for FIG. 5. The app determines that the further areas or pins are flush with the view edges, e.g., in order to determine the outer perimeter of the target area 104. At this point, given that the further areas or pin locations in space are known, the app may then fetch or determine a distance at their prominent axis to determine a length of the edge of the view, and in this way determine the area of the camera view. By determine the area of camera view, the app 108 may then determine the area of play (e.g., target area 104) by using the following formula:

Target Area=Total Pixel count×Area of Camera View per Pixel

MOE(Margin of Error)=1 sq. in.

In some aspects, if LiDAR data is unavailable, a user (e.g., user 110) may manually, via GUI 304, drop pins around a perimeter of a target area (e.g. target area 104) to be cleaned. In such aspects, the user ma walk around the perimeter of an environment, touching the screen to indicate the perimeter of the area to be cleaned (e.g., target area 104) and determine other objects in frame.

The graphical mapping 310 may then be generated based on the area of the camera view (e.g., based on LiDAR data and/or by the pins as manually inserted by the user). In some aspects, the mesh may be generated using a modified marching cubes algorithm. In such aspects, the algorithm may use a 3D discrete scalar field to make a binary image where (1) is the representation of data value that is above a color or image value (e.g., an LAB or ISO-value) and (0) is a representation of the data that is below a color or image value (e.g., a LAB or ISO-value). The environmental imaging map may then extract a polygonal mesh or otherwise data mesh of a surface (e.g., an ISO surface) from the 3D field. The elements that are extracted are referred to as voxels. By taking neighboring voxels (e.g., seven neighboring voxels) to determine the edges (e.g., twelve edges) needed for the algorithm to create a cube, the app may then generate one or more polygons needed to represent a cubic area that is passed through and then merged with the surface. For example, an index mapped to an array containing $2^8=256$ configurations within a cubic area may identify eight scalar values each as a bit in an 8-bit integer that may be implemented as follows:

if (scalar value>isovalue) set to 1 [inside the surface]

else set to 0 [outside the surface]

After this is determined, the cubes are then generated into a triangular mesh or otherwise a data mesh (e.g., a 2D and/or 3D mesh) for the graphics process unit (GPU) or processor to utilize, and that may be provided to the computing device (e.g., computing device 300) for display by the GUI (e.g., GUI 304 and/or GUI 504).

LiDAR data (or other data) may be used to implement simultaneous localization and mapping (SLAM). SLAM generally refers to constructing or updating a map (e.g., graphical mapping 310) of an unknown environment (e.g., target area 104 and/or physical environment 102) while simultaneously tracking of an agent's (e.g., user 110) location within the map or environment. Here, SLAM may be implemented to track user 110 as the user moves with the target area 104 and/or physical environment 102.

In various aspects, the graphical mapping (e.g., graphical mapping 310) may be generated and displayed on the GUI in real time or near real time.

In some aspects, objects may be removed from the graphical mapping (e.g., graphical mapping 310). For example, in such aspects environmental images may depict an object (e.g., a chair 108 as shown in FIG. 1) in the target area (e.g., target area 104). In such aspects, generation of the graphical mapping comprises removing the object such that the graphical mapping is rendered via the GUI (e.g., GUI 304) without the object. For example, the chair 108 in target area 104 may be rendered on GUI 304 without the chair 108 in order to show the target area 104 or otherwise physical environment 102 without the chair 108, and would indicate that the area of the chair (e.g., under the chair) is for cleaning by the cleaning implement (e.g., cleaning implement 106).

In addition, GUI 304 may display tracking data 312 related to graphical mapping 310 or otherwise related to cleaning target area 104 with cleaning implement 106. For example, such tracking data 312 may include last sweep date (e.g., last sweep Jan. 29, 2021), area cleaned data (e.g., 54.52382 sqft), time of clean data (e.g., 1 minute and 14 seconds), distance traveled data (e.g., 134.3448 ft), and/or coins collected data (e.g., 42 coins) for gamification area(s). It should be understood that different and/or additional tracking data may also be shown, collected, and/or stored.

Figure 4:
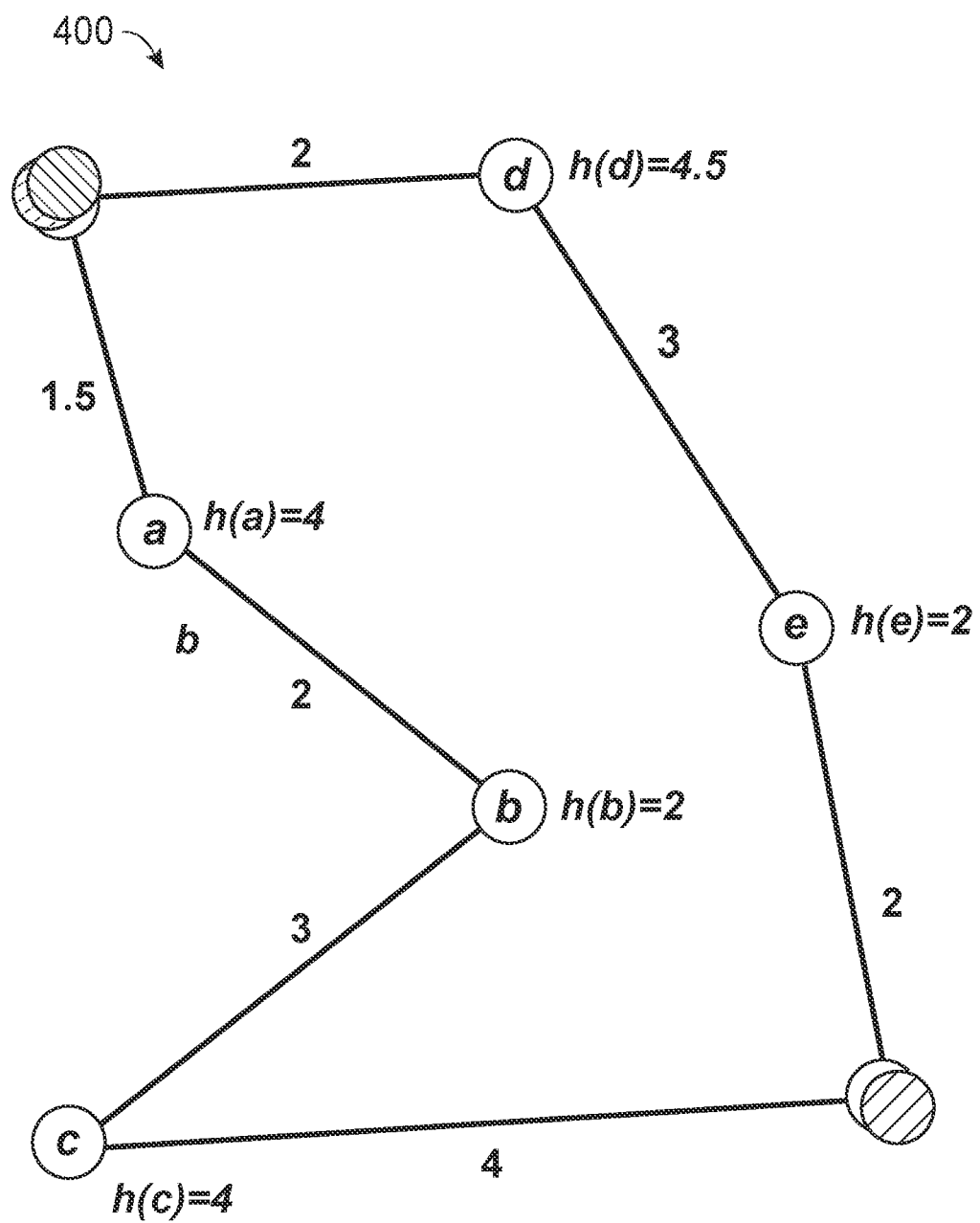
FIG. 4 illustrates an example tracking trail in accordance with various aspects disclosed herein.

FIG. 4 illustrates an example tracking trail 400 in accordance with various aspects disclosed herein. In various aspects, tracking trail 400 corresponds to trail 310t of FIG. 3, such that the disclosure of for trail 310t applies in the same or similar manner as tracking trial 400, and vice versa. Tracking trail 400 illustrates movement or tracking of a cleaning implement (e.g., cleaning implement 106) through a target area and/or physical environment (e.g., target area 104 or physical environment 102). In some aspects, a tracking trail (e.g., tracking trail 400) may also be referred to as a "snail trail" or a "tracking trail" showing either a cleaning implement movement or user movement in the target area and/or physical environment. In various aspects, a tracking trail may be captured (e.g., by a sensor) to define or provide a visual feedback of the cleaning implement (e.g., cleaning implement 106) and/or user (e.g., user 110) to or via the GUI (e.g., GUI 304 of FIG. 3 or FIG. 5). Such visual feedback may be provided in real-time such that the tracking trail (e.g., tracking trail 310t or 400) or otherwise graphical mapping that is updated as movement of the user or cleaning implement traverses the given area (e.g., target area 104).

In various aspects, position data or values may be used to build or generate the tracking trail 400. For example, in various aspects, one or more processors (e.g., one or more processors of computing device 300 and/or server(s) 602) implementing environmental imaging app 608 can be configured to detect, based on analyzed sensor data (e.g., LiDAR data or RGB data) a first position value and a second position value corresponding to a first physical location and a second physical position of a cleaning implement (e.g., cleaning implement 106) within a target area (e.g., target area 104). When the cleaning implement is in the first position then the graphical mapping may be updated, by the app executing on the one or more processors, to indicate that a first region (e.g., a first gaming region) has been traversed. Additionally, or alternatively, the graphical mapping (e.g., graphical mapping 310) may be updated to have a clean status. Further, as the cleaning implement (e.g., cleaning implement 106) moves through the environment, the app executing on the one or more processors may then update the graphical mapping (e.g., graphical mapping 310) to indicate that a second region (e.g., second gaming region) of the one or more regions has been traversed and/or as the clean status.

In various aspects, the graphical mapping (e.g., graphical mapping 310) may visually indicate on the GUI that the first and/or second region(s) have the clean status. Additionally, or alternatively, the GUI may further visually indicate a tracking trail (e.g., tracking trail 310t or 400) indicating movement of the cleaning implement from the first physical position to the second physical position.

With reference to FIG. 4, an example is shown that illustrates a tracking trail (e.g., tracking trail 310t or 400) indicating movement and tracking of the cleaning implement (e.g., cleaning implement 106) from a first physical position, to a second physical position, to a third physical position, and so forth. In the example of FIG. 4, determination of tracking trail 400 is implemented, by the app executing on the one or more processors (e.g., one or more processors of computing device 300 and/or server(s) 602), based on an A* (A-Star) algorithm, which is a graph traversal and/or path search algorithm. With respect to FIG. 4, the A-Star algorithm is used to determine boundaries of the target area 104 (e.g., playable area) and to track or establish the tracking trail (e.g., tracking trail 310t or 400) within the target area 104.

In the example of FIG. 4, a boundary around tracking trail 400 is created to define an area (e.g., one or more regions or game scenes) through which navigation or tracking through the area may occur. In various aspects, such area may correspond to target area 104, or more generally to physical environment 102. More generally, the target area 104 or otherwise one or more regions define the places in the scene where the "agent" (e.g., user 110) can stand and move. The locations of these areas or regions are mapped to a surface (e.g., a graphical surface or data representing a graphical surface) for laying on top of scene geometry. That is, the areas or regions be fitted to portions of the target area 104 in 3D and/or 2D space. The surface may be used to track the user's movement in the target area 104, e.g., by updating the surface, or its related data, where the user and/or cleaning implement 106 has been. For example, some aspects, the surface may be implemented as a navigational mesh (NavMesh), e.g., a data mesh. The NavMesh stores the surface as a series of convex polygons where movement can be tracked by one or more polygon's respective corresponding position with respect to the area or region being traversed (e.g., target area 104). With a data mesh, polygonal boundaries store information about which polygons are neighboring each other thereby defining the target area to be traversed or traveled (e.g., defining a playable area).

For example, with reference to FIG. 4, tracking trail 400 includes positions a, b, c, d, e. Tracking trail 400 also includes start and end positions (unlabeled) between positions a-e. When determining paths between two positions, the start and end locations define the path traveled by the user (e.g., user 110) and/or cleaning implement 106 in time, including where the path started and where the path ended. Each of these positions may represent or correspond to real world physical positions within target area 104 and/or physical environment 102, at which or through which a user (e.g., user 110) or cleaning implement (e.g., cleaning implement 106) traveled. In addition, each of these positions may correspond to polygons or otherwise data positions within a surface, such as a data mesh (e.g., NavMesh). Thus, as the user travels through the positions a-e, the surface or data mesh, polygons, or otherwise data of the positions may be updated to indicate the presence of the user or cleaning implement at those position.

In addition, additional data may also be determined and/or stored for the various positions (e.g., positions a-e). In the example of FIG. 4, distances are tracked and stored between the various positions. For example, the distance between position "a" and position "b" is "2," which may represent 2 feet or 2 polygons (or some other unit of measure). In this way, a total distance traveled within target area 104 may be determined.

In some aspects, positions (e.g., polygons) or a path as traversed in a tracking trail (e.g., tracking trail 400) may be determined as a path or trail where no obstructions between any two positions between any position (e.g., polygon).

Figure 5:
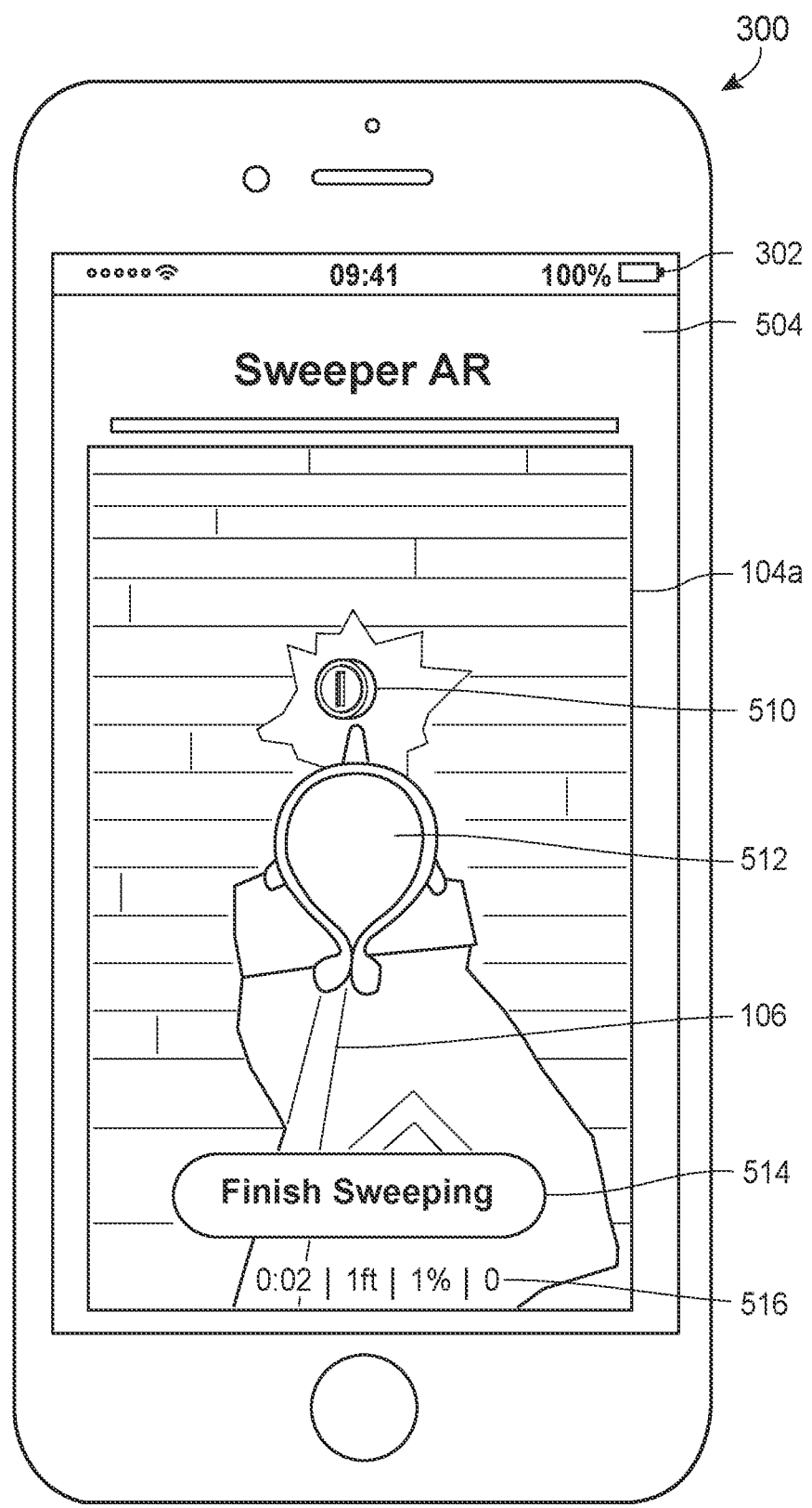
FIG. 5 illustrates an example graphic user interface (GUI) as rendered on a display screen of a user computing device and further illustrates an example activity region as displayed on the GUI, in accordance with various aspects disclosed herein.

FIG. 5 illustrates an example GUI 504 as rendered on a display screen of a user computing device and further illustrates an example activity region 104a as displayed on the GUI, in accordance with various aspects disclosed herein. As for FIG. 3, as shown in the example of FIG. 5, GUI 504 may be implemented or rendered via an application (e.g., an app executing on computing device 300). For example, as shown in the example of FIG. 5, GUI 504 may be implemented or rendered via a native app executing on user computing device 300. In the example of FIG. 5, user computing device 300 is a computer device as described herein, for example for FIGS. 1 and/or FIG. 6, e.g., where computing device 300 is illustrated as an APPLE IPHONE that implements the APPLE iOS operating system and that has display screen 302. User computing device 300 may execute one or more native applications (apps) on its operating system, including, for example, an app (e.g., environmental imaging app 608 of FIG. 6) or otherwise as described herein. Such native apps may be implemented or coded (e.g., as computing instructions) in a computing language (e.g., SWIFT) executable by the user computing device operating system (e.g., APPLE iOS) by the processor of user computing device 300. In various aspects, the imaging app (e.g., an environmental imaging app 608) executing on a mobile devices, such as user computing device 300, may be referred to as an application or app, designed to track cleaning activity in a physical environment.

The example of FIG. 5 represents a augmented reality (AR) example for a cleaning task with digital information or graphics overlaid or otherwise superimposed on a real world area or scene (e.g., target area 104). For example, as shown for FIG. 5, activity region 104a may represent target area 104 or a portion thereof through which cleaning implement 106 is currently traversing. In various aspects, activity region 104a may correspond to one or more regions, positions within a target area 104 and/or physical environment 102. In addition, activity region 104a may correspond with related digital positions including positions within 2D and/ or 3D data or data meshes, such as polygons within a NavMesh, for example, as described herein.

Graphic avatar 512 may be in a position or have a position value (e.g., position value 106p) corresponding to the cleaning implement's cleaning region (e.g., the head of a SWIFFER device traversing through activity region 104a). Graphic avatar 512 is a graphic depiction or representation, where, in the example of FIG. 5 is represented as a cartoon narwhal character traversing through activity region 104a. It is to be understood, however, that other graphics or characters be used or substituted for graphic avatar 512.

Graphic avatar 514 represents the position being cleaned in activity region 104a. In the example of FIG. 5, activity region 104a is a game region such that the target area 104 has been "gamified" or otherwise made to provide an entertainment experience as target area 104 is cleaned.

In various aspects, a user may provide a virtual incentive for another user to perform the cleaning activity as described for FIG. 5. In such aspects, one or more processors (e.g., one or more processors of computing device 300) may receive, via GUI 504, a selection indicating one or more activity regions. The one or more activity regions may be selected from the one or more regions (e.g., activity region 104a and/or target area 104) of a graphical mapping (e.g., graphical mapping 310). The one or more processors may further receive, via the GUI 504, a second selection indicating a virtual incentive (e.g., graphic coins) provided upon achieving a clean status for at least a portion of the one or more activity regions. That is, a second user may provide a second selection to the GUI 504 choosing to accept the virtual incentive in return for completing the cleaning task as described for FIG. 5. In some aspects, an activity region may be selected based on an absence of a clean status in the target area (or otherwise a desire for a particular activity region to be cleaned). In such aspects, incentives may be added to the particular activity region in order to encourage a user (e.g., a second user) to clean the desired activity region. In another embodiment the virtual incentive can be distributed based on successfully completing cleaning enabling tasks, such as incentives given for replacing cleaning implements heads when dirty, adding cleaning solutions to devices when empty, restocking depleted cleaning consumables such as wipes, pads and solutions, and properly stowing away cleaning equipment when finished.

For example, in various aspects, a virtual incentive (e.g., virtual incentive 510) may be distributed within the graphical mapping. The virtual incentive may be a "coin," "token," or other visual graphic rendered within the graphical mapping. For example, as shown by FIG. 5, a graphic coin is distributed in activity region 104a. When the scene is rendered (e.g., as shown by GUI 504), one or more processors may update the graphical mapping to include the virtual incentive (e.g., virtual incentive 510, such as one or more coins) within at least a portion of the one or more activity regions. The virtual incentive may be distributed within the graphical mapping in number of different ways. By way of non-limiting example, this may include by distribution of the virtual incentive by use of a randomizing algorithm, distribution based on biasing toward dirtier areas, distribution by selection where areas for cleaning are selected by a user (e.g., a primary user) from a GUI to indicate which areas are desired areas for cleaning, and/or distribution based on prior cleaning data (e.g., which areas have not been cleaned in a longer period of time and/or which areas tend to get dirtier or unclean the most often). In another embodiment data collected from cleaning satisfaction assessments inputted by the primary user can be used to distribute virtual incentives to areas that have greater impact on satisfaction scores. In another embodiment collected images can be used to train AI to determine what is sufficient cleaning and to place virtual incentives in locations that exhibit tendency to become more soiled, effectively training the user over time.

In the example of FIG. 5, as the graphic avatar moves through the activity region 104a, graphic coins (i.e., a virtual incentive 510) located at different positions (e.g., different polygons on a data mesh) are received, such that it appears to the use as the coins are being collected by the graphic avatar. The sum of the graphic coins are collected and tallied by app 608.

In one example, one or more processors (e.g., one or more processors of computing device 300 and/or servers 602) may execute or run a randomized algorithm to determine location or position of the coins (e.g., virtual incentive 510) within a game play area (e.g., target area 104). A user (e.g. user 110 or a second user as described herein) may place or mount a computing device to a cleaning implement (e.g., mounting computing device 300 to cleaning implement 106). The computing device (e.g., computing device 300) may render an AR based project of graphic coins (e.g., virtual incentive)

and show a trail to direct location of cleaning (e.g., sweeping with a SWIFFER device). As the user traverses positons of the trail, the tracking trail (e.g., tracking trail 310*t* and/or tracking trail 400) may be generated or determined.

In addition, a total percentage of area cleaned may be calculated or determined. For example, the app executing one or more processors may generate a series of vertices and then determine their closest neighbors to determine polygons, i.e. cubes, which may have multiple edges (e.g., twelve edges). By placing these cubes at intervals in space equivalent to their radius and by checking whether they remain in the target area 104 (e.g., game play area), the app 608 may determine the entire target area 104 (e.g., game play area) with these objects. In such aspects, the cubes may be placed at intervals in 2D and/or 3D space equivalent to their radius. Environmental imaging app 608 may then determine whether the respective cube positions or locations are within the bounded area of the target area 104. These positions or locations may then matched to a data mesh (e.g., NavMesh).

In some aspects, an optimal number of cubes may be determined for a given target area (e.g., target area 104). The optimal number of cubes corresponds to the shape and/or size of the target area. Environmental imaging app 608 can determine an optimal number of cubes based on the following algorithm. If there are too many cubes, environmental imaging app 608 may start removing or deleting cubes that are too close to a given cube currently identified in a set of cubes. The process is repeated until the total number of cubes reaches a preferred or predefined number of cubes for a given target area (e.g., target area 104). If there are too few cubes, environmental imaging app 608 may place additional cubes to reach a preferred or predefined number of cubes. Such algorithm may have a threshold to avoid infinite looping, for example, environmental imaging app 608 may stop adding cubes after 500 attempts of cube placement. The cubes can be used to track movement of a user through the target area 104, where a position of the user or cleaning implement causes a cube at that location to have a clean status. In addition, this allows the application to count the number of cubes the user has initialized and thereby destroy and re-percentage of the area they have swept (in order to reset the target area 104 for cleaning).

In additional aspects, the one or more processors update the graphical mapping to indicate a completeness status based on a count of the one or more activity regions updated with the clean status. The completeness status may represent tracking data, e.g., a percent clean scored, total area cleaned, and/or distance travelled within the cleaning area. Such tracking data may be displayed by GUI 504. For example, GUI 504 displays data 516 which includes distance traveled (e.g., 1 ft), the percentage of the cleaning task complete (e.g., 1%), and the number of coins collected (e.g., currently zero coins). It is to be understood however, that additional and/or different tracking data may be collected. In some aspects, the tracking data may be used to notify or otherwise inform a user of when a portion of the cleaning implement (such as a disposable portion, e.g., a cleaning pad or cleaning solution) should be replaced. In such aspects, the tracking data may include a distance traveled value, such as a total distance traveled value, indicating a distance that the cleaning implement has moved within one or more target areas during cleaning. The user (primary, secondary or others) can be updated on their respective GUIs in near real time on progress of the task so as not to duplicate efforts. The information can be tailored for the specific user. For example, primary hold cleaner may only desire to see task progress, while other users may desire updates on games incentives. The user may be informed, e.g., via a GUI (e.g., GUI 504) when it is time to replace a portion of the cleaning implement (e.g., a disposable portion, such as a cleaning pad or cleaning solution) based on the distance traveled value, which could be, for example, when the useful life of the given portion of the cleaning implement has elapsed. In another embodiment recommendations on the type or amount of the consumable parts of the cleaning implement may be given to user or the task assigner on the basis of the cleaning history of the users. This may be both for restocking and for optimization of cleaning based on the use history and cleaning information collected.

In some aspects, health related data of a user may be determined. In one non-limiting example, the tracking data, including the distance traveled, may be used to determine health related data for the user operating the cleaning implement. In such aspects, the graphical mapping may include, or may be based on, tracking data that indicates a distance traveled within the target area by a user where the distance traveled is used to determine health related data of the user based the user's movement within the target area. For example, data regarding the distance traveled may be provided to an app (e.g., the environmental imaging app as described herein) to track movement and determine distance as traveled by the user in the target area 104. Such movement and/or distance data may be used to determine calories consumed, steps made, or otherwise health related data of the user (e.g., the secondary user operating the cleaning implement). As an additional non-limiting example, additional sensors (e.g., motion sensors, such accelerometers, gyroscopes, and/or position sensors, e.g., GPS sensors) of a mobile device may be used to capture or record pedometric data. In such aspects, an app (e.g., the environmental imaging app as described herein) may track how many (or approximately how many) steps a user has traveled and/or the distance the user travelled. The user's average calories as burned (e.g., health related data) may be determined from one or both of these metrics. As another non-limiting example, third-party data or metrics from one or more third party devices (e.g., a FITBIT device, a GOOGLE FIT device, etc.) can also be received and used to determine health related data of user. In such aspects, the third-party data or metrics from the one or more third party devices may be combined to determine a more accurate calculation of steps taken, calories burned, and/or other health related data as describe herein. Such health related data or information may be displayed or otherwise provided to the GUI (e.g., GUI 504) (not shown).

Still further, GUI 504 is configured to display a notification based on events that occur during the cleaning task or otherwise tracking of activity region 104*a* and/or target area 104. For example, notification 514 can indicate that a cleaning task or otherwise tracking of a "swiffering" event (e.g., when an area has been cleaned with a SWIFFER cleaning device or cleaning implement) has been completed within target area 104 and/or activity region 104*a*. Historic cleaning data can be shared as well as specific task information and progress.

Figure 6:
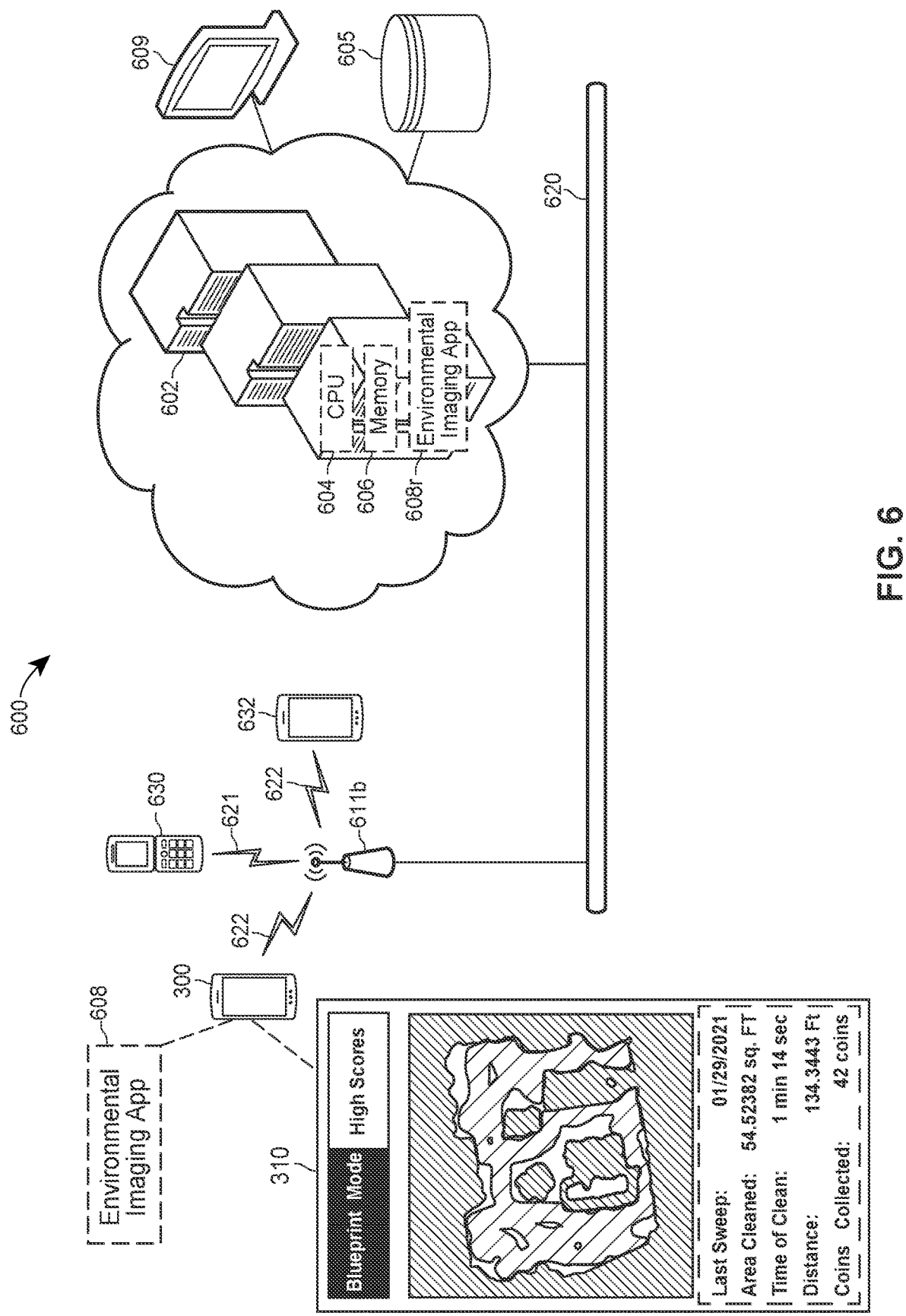
FIG. 6 illustrates a further example environmental imaging and graphical mapping system configured to track cleaning activity in a physical environment, in accordance with various aspects disclosed herein.

In some aspects, a graphical mapping (e.g., graphical mapping 310) may be provided via a second GUI of a second device, such as a second computing device or mobile device (e.g., computing device 630 or 632 as described for FIG. 6). The second device may be a device of a different user (e.g., a second user such as a second household member) other than user 110 who may perform the cleaning task. In such aspects, one or more processors of a second computing device may receive, at a second GUI as rendered on a second GUI device, an indication to accept the virtual incentive. The second GUI ma display the graphical mapping (e.g., graphical mapping 310) upon selection from the second GUI to accept the virtual incentive (e.g., virtual coins) or otherwise invitation to play a game corresponding to cleaning the target area 104 and/or activity region 104a as described for FIG. 5. In one example, a first user (e.g., a primary user) may delegate a task to the second user (e.g., a secondary user that will perform the task). In the example, the first user may scan with a sensor (e.g., such as a LiDAR sensor or RGB camera) a target area and assign a cleaning task (e.g., cleaning or sweeping a floor) to the second user. The sensor may be a sensor of a computing device, such as a mobile phone implementing an environmental imaging application (app). The app may generate a digital representation (e.g., a graphical mapping) of the target area for display on the GUI (e.g., GUI 504). The primary user may then select a desired cleaning region of the target area for the secondary user to clean. In some aspects, the virtual incentive received and/or otherwise progress made (e.g., completing a cleaning task) may be shared with other designated users or social media platforms such as the FACEBOOK platform, INSTAGRAM platform, or the like. In such aspects, a progress status (e.g., percentage of cleaning competition) or incentive received (e.g., a number of virtual coins) for a task associated with the target area (e.g., target area 104) may be transmitted to a social media platform (e.g., the FACEBOOK platform) for sharing with one or more social media users of the social media platform. For example, the environmental imaging app may provide an option (not shown) for the secondary user to submit a current progress, or a current amount of incentive received, to the social media platform. Additionally, or alternatively, the environmental imaging app may be configured to submit such information automatically and/or at a periodic time. Additionally, or alternatively, gaming aspects, including the second user interacting with the cleaning implement and receiving the virtual incentive as described herein, may not start until the head of the cleaning implement (e.g., a pad) and the environmental imaging app exchange or transmit a security code. For example, in some aspects, a base, logo, or code on, or imbedded with, the cleaning implement can trigger the start of a cleaning session or game. For example, only if and when either or both the base, logo, or code, and the cleaning implement, are detected in a frame or image would the gaming aspect commence. In such aspects, the cleaning implement would only operate with an approved or specific cleaning implement attachment, including an attachable or disposable portion (e.g., a cleaning pad) authorized for the specific cleaning implement.

FIG. 6 illustrates a further example environmental imaging and graphical mapping system 600 configured to track cleaning activity in a physical environment, in accordance with various aspects disclosed herein. In the example of FIG. 6, computing device 300 communicates with server(s) 602 for generation of graphical mapping 310 or otherwise performing functionality of the app (e.g., environmental imaging app 608) as described herein, but in a client-server mode.

In various aspects server(s) 602 comprise multiple servers, which may comprise multiple, redundant, or replicated servers as part of a server farm. In still further aspects, server(s) 602 may be implemented as cloud-based servers, such as a cloud-based computing platform. For example, server(s) 602 may be any one or more cloud-based platform (s) such as MICROSOFT AZURE, AMAZON AWS, or the like. Server(s) 602 may include one or more processor(s) 604 as well as one or more computer memories 606.

Memories 606 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. Memorie(s) 606 may store an operating system (OS) (e.g., Microsoft Windows, Linux, UNIX, etc.) capable of facilitating the functionalities, apps, methods, or other software as discussed herein. Memorie(s) 606 may also store an environmental imaging application (app) 608, which may comprise computing instructions for tracking cleaning activity in a physical environment, generating graphical mapping 310, or performing or executing other functions as described herein. Additionally, or alternatively, digital images, such as environmental images, may also be stored in database 605, which is accessible or otherwise communicatively coupled to server(s) 602. In addition, memories 606 may also store machine readable instructions, including any of one or more application(s) (e.g., an imaging application as described herein), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. It should be appreciated that one or more other applications may be envisioned and that are executed by the processor(s) 604. It should be appreciated that given the state of advancements of mobile computing devices, all of the processes functions and steps described herein may be present together on a mobile computing device (e.g., user computing device 300).

The processor(s) 604 may be connected to the memories 606 via a computer bus responsible for transmitting electronic data, data packets, or otherwise electronic signals to and from the processor(s) 604 and memories 606 in order to implement or perform the machine readable instructions, methods, processes, elements or limitations, as illustrated, depicted, or described for the various flowcharts, illustrations, diagrams, figures, and/or other disclosure herein.

Processor(s) 604 may interface with memory 606 via the computer bus to execute an operating system (OS). Processor(s) 604 may also interface with the memory 606 via the computer bus to create, read, update, delete, or otherwise access or interact with the data stored in memories 606 and/or the database 605 (e.g., a relational database, such as Oracle, DB2, My SQL, or a NoSQL based database, such as MongoDB). The data stored in memories 606 and/or database 605 may include all or part of any of the data or information described herein, including, for example, digital images (e.g., including any one or more of environmental images) and/or other images, tracking data, or other such information or data as described herein.

Server(s) 602 may further include a communication component configured to communicate (e.g., send and receive) data via one or more external/network port(s) to one or more networks or local terminals, such as computer network 620 and/or terminal 609 (for rendering or visualizing) described herein. In some aspects, server(s) 602 may include a client-server platform technology such as ASP.NET, Java J2EE, Ruby on Rails, Node.js, a web service or online API, responsive for receiving and responding to electronic requests. The server(s) 602 may implement the client-server platform technology that may interact, via the computer bus, with the memories(s) 606 (including the applications(s), component(s), API(s), data, etc. stored therein) and/or database 605 to implement or perform the machine readable instructions, methods, processes, elements or limitations, as illustrated, depicted, or described for the various flowcharts, illustrations, diagrams, figures, and/or other disclosure herein.

In various aspects, the server(s) 602 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to computer network 620. In some aspects, computer network 620 may comprise a private network or local area network (LAN). Additionally, or alternatively, computer network 620 may comprise a public network such as the Internet.

Server(s) 602 may further include or implement an operator interface configured to present information to an administrator or operator and/or receive inputs from the administrator or operator. As shown in FIG. 6, an operator interface may provide a display screen (e.g., via terminal 609). Server(s) 602 may also provide I/O components (e.g., ports, capacitive or resistive touch sensitive input panels, keys, buttons, lights, LEDs), which may be directly accessible via, or attached to, server(s) 602 or may be indirectly accessible via or attached to terminal 609. According to some aspects, an administrator or operator may access the server 602 via terminal 609 to review information, make changes, and/or perform other functions, such as those described herein.

In some aspects, server(s) 602 may perform the functionalities as discussed herein as part of a "cloud" network or may otherwise communicate with other hardware or software components within the cloud to send, retrieve, or otherwise analyze data or information described herein.

In general, a computer program or computer based product, application, or code may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processor(s) 604 (e.g., working in connection with the respective operating system in memories 606) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C #, Objective-C, Java, Scala, ActionScript, JavaScript, HTML, CSS, XML, etc.).

As shown in FIG. 6, server(s) 602 are communicatively connected, via computer network 620 to the one or more user computing devices 300, 630, and 632 via base stations 611*b*. In some aspects, base stations 611*b* may comprise cellular base stations, such as cell towers, communicating to the one or more user computing devices 300, 630, and 632 via wireless communications 621 based on any one or more of various mobile phone standards, including NMT, GSM, CDMA, UMMTS, LTE, 5G, or the like. Additionally, or alternatively, base stations 611*b* may comprise routers, wireless switches, or other such wireless connection points communicating to the one or more user computing devices 300, 630, and 632 via wireless communications 622 based on any one or more of various wireless standards, including by non-limiting example, IEEE 802.11a/b/c/g (WIFI), the BLUETOOTH standard, or the like.

Any of the one or more user computing devices 300, 630, and 632 may comprise mobile devices and/or client devices for accessing and/or communications with server(s) 602. Such mobile devices may comprise one or more mobile processor(s) and/or an imaging device for capturing images, such as images as described herein (e.g., any one or more of environmental images). In various aspects, user computing devices 300, 630, and 632 may comprise a mobile phone (e.g., a cellular phone), a tablet device, a personal data assistance (PDA), or the like, including, by non-limiting example, an APPLE iPhone or iPad device or a GOOGLE ANDROID based mobile phone or tablet.

In various aspects, the one or more user computing devices 300, 630, and 632 may implement or execute an operating system (OS) or mobile platform such as APPLE iOS and/or Google ANDROID operation system. Any of the one or more user computing devices 300, 630, and 632 may comprise one or more processors and/or one or more memories for storing, implementing, or executing computing instructions or code, e.g., a mobile application, as described in various aspects herein. As shown in FIG. 6, environmental imaging app 608 and/or an imaging application as described herein, or at least portions thereof, may also be stored locally on a memory of a user computing device (e.g., user computing device 300).

User computing devices 300, 630, and 632 may comprise a wireless transceiver to receive and transmit wireless communications 621 and/or 622 to and from base stations 611*b*. In various aspects, digital images (e.g., environmental images) may be transmitted via computer network 620 to server(s) 602 for analysis (e.g., generation of graphical mapping 310) as described herein.

In addition, the one or more user computing devices 300, 630, and 632 may include a sensor, digital camera, digital video camera, and/or otherwise sensor, sensor group, or imaging capture device or system for capturing or taking digital images and/or frames (e.g., which can be any one or more of environmental images). Each digital image may comprise LiDAR, ToF, and/or pixel data. For example, a digital camera and/or digital video camera of, e.g., any of user computing devices 300, 630, and 632, may be configured to take, capture, or otherwise generate digital images (e.g., digital environmental images) and, at least in some aspects, may store such images in a memory of a respective user computing devices. Additionally, or alternatively, such digital images may also be transmitted to and/or stored on memorie(s) 606 and/or database 605 of server(s) 602.

Still further, each of the one or more user computer devices 300, 630, and 632 may include a display screen for displaying graphics, images, text, mid-section dimension(s), product sizes, data, pixels, features, and/or other such visualizations or information as described herein. In various aspects, graphics, images, text, mid-section dimension(s), product sizes, data, pixels, features, and/or other such visualizations or information may be received from server(s) 602 for display on the display screen of any one or more of user computer devices 300, 630, and 632. Additionally, or alternatively, a user computer device may comprise, implement, have access to, render, or otherwise expose, at least in part, an interface or a guided user interface (GUI) for displaying text and/or images on its display screen. In various aspects, a display screen (e.g., display screen 302 as described for FIG. 3 herein) can also be used for providing instructions or guidance to the user of a given device (e.g., user computing device 300).

In some aspects, computing instructions and/or applications executing at the server (e.g., server(s) 602) and/or at a mobile device (e.g., mobile device 300) may be communicatively connected for analyzing LiDAR data, ToF data, and/or pixel data of one or more environmental images, as described herein. For example, one or more processors (e.g., processor(s) 604) of server(s) 602 may be communicatively coupled to a mobile device via a computer network (e.g., computer network 620). In such aspects, an imaging app may comprise a server app portion 608r configured to execute on the one or more processors of the server (e.g., server(s) 602) and a mobile app portion 608 configured to execute on one or more processors of the mobile device (e.g., any of one or more user computing devices 300, 630, and 632) and/or other such standalone imaging device. In such aspects, the server app portion is configured to communicate with the mobile app portion. The server app portion or the mobile app portion may each be configured to implement, or partially implement, one or more of: (1) generating, by one or more processors, a graphical mapping of the target area based on the one or more environmental images, the graphical mapping comprising one or more regions defining the target area; (2) detecting, by the one or more processors, a position value corresponding to a physical position of a cleaning implement within the target area; and/or (3) updating, by the one or more processors, the graphical mapping to indicate that a region of the one or more regions has a clean status.

ASPECTS OF THE DISCLOSURE

The following aspects are provided as examples in accordance with the disclosure herein and are not intended to limit the scope of the disclosure.

1. An environmental imaging and graphical mapping method for tracking cleaning activity in a physical environment, the environmental imaging and graphical mapping method comprising: obtaining one or more environmental images as captured by a sensor, each of the one or more environmental images depicting at least a portion of a target area in the physical environment; generating, by one or more processors, a graphical mapping of the target area based on the one or more environmental images, the graphical mapping comprising one or more regions defining the target area; detecting, by the one or more processors, a position value corresponding to a physical position of a cleaning implement within the target area; updating, by the one or more processors, the graphical mapping to indicate that a region of the one or more regions has a clean status; and displaying, on a graphical user interface (GUI), a graphical mapping of the target area, the graphical mapping visually indicating that the region has the clean status.

2. The environmental imaging and graphical mapping method of aspect 1, wherein a mobile device includes at least one of the one or more processors, wherein the cleaning implement is configured to receive the mobile device as an attachment, and wherein the mobile device generates the position value as the cleaning implement moves within the target area.

3. The environmental imaging and graphical mapping method of any one of aspects 1-2, wherein a wearable device includes at least one of the one or more processors, wherein the wearable device generates the position value as the cleaning implement moves within the target area.

4. The environmental imaging and graphical mapping method of any one of aspects 1-3 further comprising: detecting, by the one or more processors, a second position value corresponding to a second physical position of the cleaning implement within the target area; and updating, by the one or more processors, the graphical mapping to indicate that a second region of the one or more regions has a clean status, wherein the graphical mapping visually indicates on the GUI that the second region has the clean status, and wherein the GUI further visually indicates a tracking trail indicating movement of the cleaning implement from the physical position to the second physical position.

5. The environmental imaging and graphical mapping method of any one of aspects 1-4 further comprising: receiving, via the GUI, a selection indicating one or more activity regions, the one or more activity regions selected from the one or more regions of the graphical mapping; and receiving, via the GUI, a second selection indicating a virtual incentive provided upon achieving the clean status for at least a portion of the one or more activity regions.

6. The environmental imaging and graphical mapping method of aspect 5 further comprising: updating, by the one or more processors, at least one of the graphical mapping or the GUI to include the virtual incentive within at least a portion of the one or more activity regions.

7. The environmental imaging and graphical mapping method of aspect 5 further comprising: updating, by the one or more processors, the graphical mapping to indicate a completeness status based on a count of the one or more activity regions updated with the clean status.

8. The environmental imaging and graphical mapping method of aspect 5 further comprising: receiving, at a second GUI, an indication to accept the virtual incentive; and displaying, on the second GUI, the graphical mapping upon selection from the second GUI to accept the virtual incentive.

9. The environmental imaging and graphical mapping method of any one of aspects 1-8, wherein the sensor comprises one or more of: (a) a light-detection-and-ranging (LiDAR) sensor wherein at least one of the one or more environmental images comprises LiDAR data as captured by the LiDAR sensor; (b) a radio-detection-and-ranging (RADAR) sensor wherein at least one of the one or more environmental images comprises RADAR data as captured by the RADAR sensor; (c) a camera sensor wherein at least one of the one or more environmental images comprises pixel-based data as captured by the camera sensor; or (d) an ultrasonic sensor wherein the one or more environmental images are correlated with sound data of the target area in the physical environment.

10. The environmental imaging and graphical mapping method of any one of aspects 1-9, wherein the graphical mapping is generated and displayed on the GUI in real time or near real time.

11. The environmental imaging and graphical mapping method of any one of aspects 1-10, wherein the one or more environmental images depict an object in the target area, and wherein generation of the graphical mapping comprises removing the object such that the graphical mapping is rendered on the GUI without the object.

12. The environmental imaging and graphical mapping method of aspect 1, wherein the clean status is further determined by the sensor being positioned within the target area based on a known distance or positional offset between the sensor and at least a portion of the cleaning implement.

13. The environmental imaging and graphical mapping method of aspect 1, wherein the clean status is further determined by a first image and a second image as captured by the sensor, wherein the first image defines a pre-cleaning image and the second image comprises a post-cleaning image, and wherein imaging artifacts that differ in the second image compared to the first image indicate that cleaning has occurred or is occurring in the target area.

14. The environmental imaging and graphical mapping method of aspect 1 further comprising: determining health related data of a user.

15. The environmental imaging and graphical mapping method of aspect 1, wherein a progress status or incentive received for a task associated with the target area is transmitted to a social media platform for sharing with one or more social media users of the social media platform.

16. An environmental imaging and graphical mapping system configured to track cleaning activity in a physical environment, the environmental imaging and graphical mapping system comprising: a sensor configured to obtain environmental images; a cleaning implement; and an environmental imaging application comprising computing instructions and configured for execution on one or more processors, wherein the computing instructions when executed by the one or more processors, cause the one or more processors to: obtain one or more environmental images as captured by the sensor, each of the one or more environmental images depicting at least a portion of a target area in the physical environment; generate a graphical mapping of the target area based on the one or more environmental images, the graphical mapping comprising one or more regions defining the target area; detect a position value corresponding to a physical position of the cleaning implement within the target area; update the graphical mapping to indicate that a region of the one or more regions has a clean status; and display, on a graphical user interface (GUI), a graphical mapping of the target area, the graphical mapping visually indicating that the region has the clean status.

17. The environmental imaging and graphical mapping system of aspect 16, wherein a mobile device includes at least one of the one or more processors, wherein the cleaning implement is configured to receive the mobile device as an attachment, and wherein the mobile device generates the position value as the cleaning implement moves within the target area.

18. The environmental imaging and graphical mapping system of any one of aspects 16-17, wherein a wearable device includes at least one of the one or more processors, wherein the wearable device generates the position value as the cleaning implement moves within the target area.

19. The environmental imaging and graphical mapping system of any one of aspects 16-18, wherein the computing instructions when executed by the one or more processors, further cause the one or more processors to: detect, by the one or more processors, a second position value corresponding to a second physical position of the cleaning implement within the target area; and update, by the one or more processors, the graphical mapping to indicate that a second region of the one or more regions has a clean status, wherein the graphical mapping visually indicates on the GUI that the second region has the clean status, and wherein the GUI further visually indicates a tracking trail indicating movement of the cleaning implement from the physical position to the second physical position.

20. The environmental imaging and graphical mapping system of any one of aspects 16-19, wherein the computing instructions when executed by the one or more processors, further cause the one or more processors to: receive, via the GUI, a selection indicating one or more activity regions, the one or more activity regions selected from the one or more regions of the graphical mapping; and receive, via the GUI, a second selection indicating a virtual incentive provided upon achieving the clean status for at least a portion of the one or more activity regions.

21. The environmental imaging and graphical mapping system of aspect 20, wherein the computing instructions when executed by the one or more processors, further cause the one or more processors to: update, by the one or more processors, at least one of the graphical mapping or the GUI to include the virtual incentive within at least a portion of the one or more activity regions.

22. The environmental imaging and graphical mapping system of aspect 20, wherein the computing instructions when executed by the one or more processors, further cause the one or more processors to: update, by the one or more processors, the graphical mapping to indicate a completeness status based on a count of the one or more activity regions updated with the clean status.

23. The environmental imaging and graphical mapping system of aspect 20, wherein the computing instructions when executed by the one or more processors, further cause the one or more processors to: receive, at a second GUI, an indication to accept the virtual incentive; and display, on the second GUI, the graphical mapping upon selection from the second GUI to accept the virtual incentive.

24. The environmental imaging and graphical mapping system of any one of aspects 16-23, wherein the sensor comprises one or more of: (a) a light-detection-and-ranging (LiDAR) sensor wherein at least one of the one or more environmental images comprises LiDAR data as captured by the LiDAR sensor; (b) a radio-detection-and-ranging (RADAR) sensor wherein at least one of the one or more environmental images comprises RADAR data as captured by the RADAR sensor; (c) a camera sensor wherein at least one of the one or more environmental images comprises pixel-based data as captured by the camera sensor; or (d) an ultrasonic sensor wherein the one or more environmental images are correlated with sound data of the target area in the physical environment.

25. The environmental imaging and graphical mapping system of any one of aspects 16-24, wherein the graphical mapping is generated and displayed on the GUI in real time or near real time.

26. The environmental imaging and graphical mapping system of any one of aspects 16-25, wherein the one or more environmental images depict an object in the target area, and wherein generation of the graphical mapping comprises removing the object such that the graphical mapping is rendered on the GUI without the object.

27. A tangible, non-transitory computer-readable medium storing instructions for tracking cleaning activity in a physical environment, that when executed by one or more processors of a computing device cause the one or more processors of the computing device to: obtain one or more environmental images as captured by a sensor, each of the one or more environmental images depicting at least a portion of a target area in the physical environment; generate a graphical mapping of the target area based on the one or more environmental images, the graphical mapping comprising one or more regions defining the target area; detect a position value corresponding to a physical position of a cleaning implement within the target area; update the graphical mapping to indicate that a region of the one or more regions has a clean status; and display, on a graphical user interface (GUI), a graphical mapping of the target area, the graphical mapping visually indicating that the region has the clean status.

4. The environmental imaging and graphical mapping method of any one of aspects 1-4 further comprising: obtaining one or more environmental images as captured by a sensor, each of the one or more environmental images depicting the cleaning implement being used for the cleaning operation; detecting, by the one or more processors, the level of dirt or material accumulated on the cleaning implement and determine extent of cleaning implement use and indicating whether the pad is effectively cleaning the surface and estimating the remaining lifetime for the pad.

ADDITIONAL CONSIDERATIONS

Although the disclosure herein sets forth a detailed description of numerous different aspects, it should be understood that the legal scope of the description is defined by the words of the claims set forth at the end of this patent and equivalents. The detailed description is to be construed as exemplary only and does not describe every possible aspect since describing every possible aspect would be impractical. Numerous alternative aspects may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain aspects are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example aspects, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example aspects, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example aspects, the processor or processors may be located in a single location, while in other aspects the processors may be distributed across a number of locations.

The performance of certain of the operations may be distributed among the one or more processors, not only residing within a single machine, but deployed across a number of machines. In some example aspects, the one or more processors or processor-implemented modules may be located in a single geographic location (e.g., within a home environment, an office environment, or a server farm). In other aspects, the one or more processors or processor-implemented modules may be distributed across a number of geographic locations.

This detailed description is to be construed as exemplary only and does not describe every possible aspect, as describing every possible aspect would be impractical, if not impossible. A person of ordinary skill in the art may implement numerous alternate aspects, using either current technology or technology developed after the filing date of this application.

Those of ordinary skill in the art will recognize that a wide variety of modifications, alterations, and combinations can be made with respect to the above described aspects without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular aspects of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An environmental imaging and graphical mapping method for tracking cleaning activity in a physical environment, the environmental imaging and graphical mapping method comprising:
   obtaining one or more environmental images as captured by a sensor, each of the one or more environmental images depicting at least a portion of a target area in the physical environment;
   generating, by one or more processors, a graphical mapping of the target area based on the one or more environmental images, the graphical mapping comprising one or more regions defining the target area;
   detecting, by the one or more processors, a position value corresponding to a physical position of a cleaning implement within the target area;
   updating, by the one or more processors, the graphical mapping to indicate that a region of the one or more regions has a clean status; and
   displaying, on a graphical user interface (GUI), the graphical mapping of the target area, the graphical mapping visually indicating that the region has the clean status;
   receiving, via the GUI, a selection indicating one or more activity regions, the one or more activity regions selected from the one or more regions of the graphical mapping; and
   receiving, via the GUI, a second selection indicating a virtual incentive provided upon achieving the clean status for at least a portion of the one or more activity regions;
   receiving, at a second GUI, an indication to accept the virtual incentive; and
   displaying, on the second GUI, the graphical mapping upon selection from the second GUI to accept the virtual incentive.

2. The environmental imaging and graphical mapping method of claim 1,
   wherein a mobile device includes at least one of the one or more processors,
   wherein the cleaning implement is configured to receive the mobile device as an attachment, and
   wherein the mobile device generates the position value as the cleaning implement moves within the target area.

3. The environmental imaging and graphical mapping method of claim 1,
   wherein a wearable device includes at least one of the one or more processors,
   wherein the wearable device generates the position value as the cleaning implement moves within the target area.

4. The environmental imaging and graphical mapping method of claim 1 further comprising:
   detecting, by the one or more processors, a second position value corresponding to a second physical position of the cleaning implement within the target area; and
   updating, by the one or more processors, the graphical mapping to indicate that a second region of the one or more regions has a clean status,
   wherein the graphical mapping visually indicates on the GUI that the second region has the clean status, and
   wherein the GUI further visually indicates a tracking trail indicating movement of the cleaning implement from the physical position to the second physical position.

5. The environmental imaging and graphical mapping method of claim 1 further comprising:
   updating, by the one or more processors, at least one of the graphical mapping or the GUI to include the virtual incentive within at least a portion of the one or more activity regions.

6. The environmental imaging and graphical mapping method of claim 1 further comprising:
   updating, by the one or more processors, the graphical mapping to indicate a completeness status based on a count of the one or more activity regions updated with the clean status.

7. The environmental imaging and graphical mapping method of claim 1,
   wherein the sensor comprises one or more of: (a) a light-detection-and-ranging (LiDAR) sensor wherein at least one of the one or more environmental images comprises LiDAR data as captured by the LiDAR sensor; (b) a radio-detection-and-ranging (RADAR) sensor wherein at least one of the one or more environmental images comprises RADAR data as captured by the RADAR sensor; (c) a camera sensor wherein at least one of the one or more environmental images comprises pixel-based data as captured by the camera sensor; or (d) an ultrasonic sensor wherein the one or more environmental images are correlated with sound data of the target area in the physical environment.

8. The environmental imaging and graphical mapping method of claim 1,
   wherein the graphical mapping is generated and displayed on the GUI in real time or near real time.

9. The environmental imaging and graphical mapping method of claim 1,
   wherein the one or more environmental images depict an object in the target area, and
   wherein generation of the graphical mapping comprises removing the object such that the graphical mapping is rendered on the GUI without the object.

10. The environmental imaging and graphical mapping method of claim 1, wherein the clean status is further determined by the sensor being positioned within the target area based on a known distance or positional offset between the sensor and at least a portion of the cleaning implement.

11. The environmental imaging and graphical mapping method of claim 1, wherein the clean status is further determined by a first image and a second image as captured by the sensor, wherein the first image defines a pre-cleaning image and the second image comprises a post-cleaning image, and wherein imaging artifacts that differ in the second image compared to the first image indicate that cleaning has occurred or is occurring in the target area.

12. The environmental imaging and graphical mapping method of claim 1 further comprising: determining health related data of a user.

13. The environmental imaging and graphical mapping method of claim 1, wherein a progress status or incentive received for a task associated with the target area is transmitted to a social media platform for sharing with one or more social media users of the social media platform.

14. An environmental imaging and graphical mapping system configured to track cleaning activity in a physical environment, the environmental imaging and graphical mapping system comprising:
  a sensor configured to obtain environmental images;
  a cleaning implement; and
  an environmental imaging application (app) comprising computing instructions and configured for execution on one or more processors, wherein the computing instructions when executed by the one or more processors, cause the one or more processors to:
  obtain one or more environmental images as captured by the sensor, each of the one or more environmental images depicting at least a portion of a target area in the physical environment;
  generate a graphical mapping of the target area based on the one or more environmental images, the graphical mapping comprising one or more regions defining the target area;
  detect a position value corresponding to a physical position of the cleaning implement within the target area;
  update the graphical mapping to indicate that a region of the one or more regions has a clean status; and
  display, on a graphical user interface (GUI), the graphical mapping of the target area, the graphical mapping visually indicating that the region has the clean status;
  wherein the computing instructions when executed by the one or more processors, further cause the one or more processors to:
  receive, via the GUI, a selection indicating one or more activity regions, the one or more activity regions selected from the one or more regions of the graphical mapping; and
  receive, via the GUI, a second selection indicating a virtual incentive provided upon achieving the clean status for at least a portion of the one or more activity regions;
  wherein the computing instructions when executed by the one or more processors, further cause the one or more processors to:
  receive, at a second GUI, an indication to accept the virtual incentive; and
  display, on the second GUI, the graphical mapping upon selection from the second GUI to accept the virtual incentive.

15. The environmental imaging and graphical mapping system of claim 14,
  wherein a mobile device includes at least one of the one or more processors,
  wherein the cleaning implement is configured to receive the mobile device as an attachment, and
  wherein the mobile device generates the position value as the cleaning implement moves within the target area.

16. The environmental imaging and graphical mapping system of claim 14,
  wherein a wearable device includes at least one of the one or more processors,
  wherein the wearable device generates the position value as the cleaning implement moves within the target area.

17. The environmental imaging and graphical mapping system of claim 14, wherein the computing instructions when executed by the one or more processors, further cause the one or more processors to:
  detect, by the one or more processors, a second position value corresponding to a second physical position of the cleaning implement within the target area; and
  update, by the one or more processors, the graphical mapping to indicate that a second region of the one or more regions has a clean status,
  wherein the graphical mapping visually indicates on the GUI that the second region has the clean status, and
  wherein the GUI further visually indicates a tracking trail indicating movement of the cleaning implement from the physical position to the second physical position.

18. The environmental imaging and graphical mapping system of claim 17, wherein the computing instructions when executed by the one or more processors, further cause the one or more processors to:
  update, by the one or more processors, at least one of the graphical mapping or the GUI to include the virtual incentive within at least a portion of the one or more activity regions.

19. The environmental imaging and graphical mapping system of claim 17, wherein the computing instructions when executed by the one or more processors, further cause the one or more processors to:
  update, by the one or more processors, the graphical mapping to indicate a completeness status based on a count of the one or more activity regions updated with the clean status.

20. The environmental imaging and graphical mapping system of claim 14,
  wherein the sensor comprises one or more of: (a) a light-detection-and-ranging (LiDAR) sensor wherein at least one of the one or more environmental images comprises LiDAR data as captured by the LiDAR sensor; (b) a radio-detection-and-ranging (RADAR) sensor wherein at least one of the one or more environmental images comprises RADAR data as captured by the RADAR sensor; (c) a camera sensor wherein at least one of the one or more environmental images comprises pixel-based data as captured by the camera sensor; or (d) an ultrasonic sensor wherein the one or more environmental images are correlated with sound data of the target area in the physical environment.

21. The environmental imaging and graphical mapping system of claim 14,
  wherein the graphical mapping is generated and displayed on the GUI in real time or near real time.

22. The environmental imaging and graphical mapping system of claim 14,
  wherein the one or more environmental images depict an object in the target area, and
  wherein generation of the graphical mapping comprises removing the object such that the graphical mapping is rendered on the GUI without the object.

* * * * *